US011277280B2

(12) United States Patent
White et al.

(10) Patent No.: US 11,277,280 B2
(45) Date of Patent: Mar. 15, 2022

(54) CONTENT CENTRIC NETWORKING SYSTEMS AND METHODS

(71) Applicant: CABLE TELEVISION LABORATORIES, INC., Louisville, CO (US)

(72) Inventors: Gregory C. White, Louisville, CO (US); Karthik Sundaresan, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/358,663

(22) Filed: Mar. 19, 2019

(65) Prior Publication Data
US 2019/0288874 A1    Sep. 19, 2019

Related U.S. Application Data

(60) Provisional application No. 62/645,000, filed on Mar. 19, 2018, provisional application No. 62/644,991, filed on Mar. 19, 2018, provisional application No. 62/645,009, filed on Mar. 19, 2018.

(51) Int. Cl.
*H04L 12/46* (2006.01)
*H04L 67/63* (2022.01)
*H04Q 11/00* (2006.01)
*H04L 12/28* (2006.01)

(52) U.S. Cl.
CPC ...... *H04L 12/4633* (2013.01); *H04L 12/2801* (2013.01); *H04L 67/327* (2013.01); *H04Q 11/0067* (2013.01); *H04Q 2011/0079* (2013.01)

(58) Field of Classification Search
CPC ..... H04L 67/141; H04L 12/66; H04L 45/745; H04L 61/2007; H04L 61/30; H04L 67/2842; H04L 67/327; H04L 69/16; H04L 69/161; H04L 69/22
See application file for complete search history.

(56) References Cited

U.S. PATENT DOCUMENTS

| 10,038,715 B1* | 7/2018 | Majkowski | H04L 63/1416 |
| 2006/0092964 A1* | 5/2006 | Park | H04L 61/251 |
| | | | 370/437 |
| 2007/0183379 A1* | 8/2007 | Itamiya | H04W 24/00 |
| | | | 370/338 |
| 2007/0230449 A1* | 10/2007 | Arai | H04M 1/2535 |
| | | | 370/352 |

(Continued)

*Primary Examiner* — Shean Tokuta
(74) *Attorney, Agent, or Firm* — David Daniel Smith; Cable Television Laboratories, Inc.

(57) ABSTRACT

Methods, systems, and devices for Content-Centric Networking (CCN) are described. In some cases, a node may receive a CCN packet from an upstream node and communicate the CCN packet to one or more downstream nodes (e.g., that previously requested the CCN packet). In a first case, the node may establish a persistent internet protocol (IP) tunnel with the downstream node and communicate the CCN packet to the downstream node by the persistent IP tunnel. Here, a cable modem between the node and the downstream node may not decode the CCN packet. In a second case, the node may append an identifier to the CCN packet prior to communicating the CCN packet to the one or more downstream nodes. Here, the identifier may indicate to the downstream nodes which CCN packets are relevant to the downstream node.

20 Claims, 15 Drawing Sheets

(56) References Cited

U.S. PATENT DOCUMENTS

| | | | |
|---|---|---|---|
| 2010/0217882 A1* | 8/2010 | Yang | H04L 12/4633 709/229 |
| 2013/0010790 A1* | 1/2013 | Shao | H04L 45/16 370/390 |
| 2015/0117453 A1* | 4/2015 | Mosko | H04L 45/7453 370/392 |
| 2015/0186775 A1* | 7/2015 | Cruz Mota | G06F 30/20 706/46 |
| 2016/0171184 A1* | 6/2016 | Solis | G06F 21/10 726/19 |
| 2016/0224799 A1* | 8/2016 | Uzun | G06F 21/6227 |
| 2016/0286281 A1* | 9/2016 | Shkedi | H04L 12/66 |
| 2017/0272473 A1* | 9/2017 | Fox | H04L 65/1069 |
| 2018/0007176 A1* | 1/2018 | Suthar | H04L 69/04 |
| 2018/0103128 A1* | 4/2018 | Muscariello | H04L 69/22 |
| 2018/0115566 A1* | 4/2018 | Azvine | H04L 63/0428 |
| 2018/0124185 A1* | 5/2018 | Breitkreutz | H04L 67/141 |
| 2018/0131673 A1* | 5/2018 | White | H04L 67/2842 |
| 2018/0205655 A1* | 7/2018 | Ueda | H04L 12/66 |
| 2018/0206278 A1* | 7/2018 | Mildh | H04L 67/327 |
| 2018/0213038 A1* | 7/2018 | Chung | H04L 63/00 |
| 2018/0241669 A1* | 8/2018 | Muscariello | H04L 63/10 |
| 2018/0241679 A1* | 8/2018 | Muscariello | H04L 67/327 |
| 2018/0248932 A1* | 8/2018 | Lei | H04L 67/141 |
| 2018/0278522 A1* | 9/2018 | Asati | H04L 67/327 |
| 2018/0288726 A1* | 10/2018 | Azgin | H04L 43/0864 |
| 2018/0302323 A1* | 10/2018 | Moiseenko | H04L 45/745 |
| 2018/0343194 A1* | 11/2018 | Liu | H04L 45/22 |
| 2018/0368042 A1* | 12/2018 | Jin | H04W 36/18 |
| 2019/0081890 A1* | 3/2019 | Ravindran | H04L 67/327 |
| 2019/0158228 A1* | 5/2019 | Wang | H04L 1/1819 |
| 2019/0199628 A1* | 6/2019 | Amin | H04L 69/22 |
| 2019/0288874 A1* | 9/2019 | White | H04L 45/50 |
| 2020/0053187 A1* | 2/2020 | Roeland | H04L 67/2842 |
| 2020/0403861 A1* | 12/2020 | Saad | H04L 47/10 |

\* cited by examiner

CONTENT CENTRIC NETWORKING SYSTEMS AND METHODS

BACKGROUND

Information Centric Networking is an emerging networking approach that aims to address many of the shortcomings inherent with Internet Protocol (IP) networking. One specific approach to Information Centric Networking, also known as Content-Centric Networking (CCN) and/or Named Data Networking (NDN), appears to be gaining mindshare in the research community and in industry, and promises to significantly improve network scalability, performance, and reduce cost in comparison to a network built on IP networking.

SUMMARY

A system may be configured to communicate using various network protocols, including Content-Centric Networking (CCN) and Internet Protocol (IP) networking, or any other combination or appropriate network protocol. The system may be configured to communicate over various networks comprised of various network links, including data over cable service interface specification (DOCSIS), ethernet, Wi-Fi, Long Term Evolution (LTE), passive optical network (PON), or any other combination or appropriate network. The system may include a first node (e.g., a modem termination system (MTS)) and one or more downstream nodes (e.g., a modem, a router). In order to use CCN in a networking system, the first node may employ various techniques. In some examples, the first node may establish a persistent IP tunnel with a downstream router and communicate CCN communications (e.g., interest messages, content objects/data packets) by the persistent IP tunnel. In some examples, the first node may insert, append, or include an identifier to a CCN packet indicating one or more downstream nodes associated with the CCN packet. Here, the identifier may be preconfigured (e.g., by the MTS) or based on a content object name of the CCN packet.

A method at a node is described. The method may include receiving, from a router, a request to establish a persistent internet protocol (IP) tunnel, establishing the persistent IP tunnel between the node and the router upon receiving the request, and communicating a Content-Centric Networking (CCN) packet via the persistent IP tunnel between the node to the router.

An apparatus at a node is described. The apparatus may include a processor, memory in electronic communication with the processor, and instructions stored in the memory. The instructions may be executable by the processor to cause the apparatus to receive, from a router, a request to establish a persistent internet protocol (IP) tunnel, establish the persistent IP tunnel between the node and the router upon receiving the request, and communicate a Content-Centric Networking (CCN) packet via the persistent IP tunnel between the node to the router.

Another apparatus at a node is described. The apparatus may include means for receiving, from a router, a request to establish a persistent internet protocol (IP) tunnel, establishing the persistent IP tunnel between the node and the router upon receiving the request, and communicating a Content-Centric Networking (CCN) packet via the persistent IP tunnel between the node to the router.

A non-transitory computer-readable medium for storing code at a node is described. The code may include instructions executable by a processor to receive, from a router, a request to establish a persistent internet protocol (IP) tunnel, establish the persistent IP tunnel between the node and the router upon receiving the request, and communicate a Content-Centric Networking (CCN) packet via the persistent IP tunnel between the node to the router.

Some examples of the method, apparatuses, and non-transitory computer-readable medium described herein may further include operations, features, means, or instructions for receiving, from a server, configuration information for the persistent IP tunnel, and forwarding the configuration information to the router, where the request to establish the persistent IP tunnel may be based on the configuration information.

In some examples of the method, apparatuses, and non-transitory computer-readable medium described herein, the configuration information includes one or more addresses for the persistent IP tunnel.

In some examples of the method, apparatuses, and non-transitory computer-readable medium described herein, each of the one or more addresses may be encoded as type-length-values (TLVs).

In some examples of the method, apparatuses, and non-transitory computer-readable medium described herein, establishing the persistent IP tunnel further may include operations, features, means, or instructions for transmitting, to the router, a message indicating the establishing the persistent IP tunnel based on receiving the request to establish the persistent IP tunnel, and receiving, from the router, an acknowledgement indicating successful receipt of the message indicating the establishing the persistent IP tunnel.

Some examples of the method, apparatuses, and non-transitory computer-readable medium described herein may further include operations, features, means, or instructions for receiving, from the router and by the persistent IP tunnel, an interest message indicating content.

Some examples of the method, apparatuses, and non-transitory computer-readable medium described herein may further include operations, features, means, or instructions for forwarding the interest message to a second node based on the indicated content.

Some examples of the method, apparatuses, and non-transitory computer-readable medium described herein may further include operations, features, means, or instructions for receiving, from the second node, the indicated content, and forwarding the indicated content to the router by the persistent IP tunnel.

Some examples of the method, apparatuses, and non-transitory computer-readable medium described herein may further include operations, features, means, or instructions for forwarding the indicated content to the router may be based on an entry in a pending interest table (PIT) associating the indicated content with the router.

Some examples of the method, apparatuses, and non-transitory computer-readable medium described herein may further include operations, features, means, or instructions for receiving, from a second router, a second request to establish a second persistent IP tunnel, establishing the second persistent IP tunnel between the node and the second router based on the second request, where establishing the second persistent IP tunnel occurs at a time when the persistent IP tunnel may be established, and communicating one or more CCN packets via the second persistent IP tunnel between the node and the second router.

Some examples of the method, apparatuses, and non-transitory computer-readable medium described herein may further include operations, features, means, or instructions for receiving, from the router and by the persistent IP tunnel, an interest message indicating content, forwarding the interest message to a second node based on the indicated content, receiving, from the second router and by the second persistent IP tunnel, a second interest message indicating the content, where the receiving the second interest message occurs after forwarding the interest message to the second node, receiving, from the second node, the indicated content based on forwarding the interest message, forwarding the indicated content to the router by the persistent IP tunnel based on receiving the interest message from the router, and forwarding the indicated content to the second router by the second persistent IP tunnel based on receiving the second interest message from the second router.

In some examples of the method, apparatuses, and non-transitory computer-readable medium described herein, receiving the request to establish the persistent IP tunnel may include operations, features, means, or instructions for receiving the request via a link layer of a protocol stack.

In some examples of the method, apparatuses, and non-transitory computer-readable medium described herein, the router may be one of a digital subscriber line (DSL) modem, an optical network terminal (ONT), or a small cell.

In some examples of the method, apparatuses, and non-transitory computer-readable medium described herein, the node may be a modem termination system (MTS) including a cable MTS (CMTS), an optical line terminator (OLT), or a mobile core.

A method is described. The method may include receiving, at a node, a content-centric network (CCN) packet from an upstream node, identifying a subset of one or more downstream nodes associated with the CCN packet, appending an identifier to the CCN packet, where the identifier is associated with at least the subset of one or more downstream nodes, and forwarding the CCN packet with the appended identifier to the one or more downstream nodes.

An apparatus is described. The apparatus may include a processor, memory in electronic communication with the processor, and instructions stored in the memory. The instructions may be executable by the processor to cause the apparatus to receive, at a node, a content-centric network (CCN) packet from an upstream node, identify a subset of one or more downstream nodes associated with the CCN packet, append an identifier to the CCN packet, where the identifier is associated with at least the subset of one or more downstream nodes, and forward the CCN packet with the appended identifier to the one or more downstream nodes.

Another apparatus is described. The apparatus may include means for receiving, at a node, a content-centric network (CCN) packet from an upstream node, identifying a subset of one or more downstream nodes associated with the CCN packet, appending an identifier to the CCN packet, where the identifier is associated with at least the subset of one or more downstream nodes, and forwarding the CCN packet with the appended identifier to the one or more downstream nodes.

A non-transitory computer-readable medium for storing code is described. The code may include instructions executable by a processor to receive, at a node, a content-centric network (CCN) packet from an upstream node, identify a subset of one or more downstream nodes associated with the CCN packet, append an identifier to the CCN packet, where the identifier is associated with at least the subset of one or more downstream nodes, and forward the CCN packet with the appended identifier to the one or more downstream nodes.

In some examples of the method, apparatuses, and non-transitory computer-readable medium described herein, the appended identifier enables the subset of one or more downstream nodes to decode the CCN packet.

Some examples of the method, apparatuses, and non-transitory computer-readable medium described herein may further include operations, features, means, or instructions for receiving, at the node, an interest message from a first downstream node, the interest message including a content identifier indicating some content within the CCN packet, generating, by the node, the appended identifier based on the content identifier, and forwarding the interest message to the upstream node prior to receiving the CCN packet.

Some examples of the method, apparatuses, and non-transitory computer-readable medium described herein may further include operations, features, means, or instructions for receiving, from a second downstream node, a second interest message including the content identifier, where the subset of one or more downstream nodes includes the first downstream node and the second downstream node.

In some examples of the method, apparatuses, and non-transitory computer-readable medium described herein, identifying the subset of one or more downstream nodes further may include operations, features, means, or instructions for determining the subset of one or more downstream nodes associated with the appended identifier based on receiving the interest message including the content identifier.

In some examples of the method, apparatuses, and non-transitory computer-readable medium described herein, the subset includes each of the one or more downstream nodes, and the appended identifier may be associated with each of the one or more downstream nodes.

Some examples of the method, apparatuses, and non-transitory computer-readable medium described herein may further include operations, features, means, or instructions for transmitting an indication to each of the one or more downstream nodes indicating one or more identifiers associated with each of the one or more downstream nodes, where the transmitting the indication occurs prior to receiving the CCN packet.

In some examples of the method, apparatuses, and non-transitory computer-readable medium described herein, the appended identifier may be associated with a group of downstream nodes of a same orthogonal division multiplexing (ODM) scheme, the group of downstream nodes including at least the subset of one or more downstream nodes.

In some examples of the method, apparatuses, and non-transitory computer-readable medium described herein, the ODM may be orthogonal frequency division multiplexing (OFDM), orthogonal polarization division multiplexing, orthogonal time division multiplexing, or orthogonal frequency division multiple access (OFDMA).

In some examples of the method, apparatuses, and non-transitory computer-readable medium described herein, the subset includes a single downstream node of the one or more downstream nodes, and the appended identifier may be associated with the single downstream node.

In some examples of the method, apparatuses, and non-transitory computer-readable medium described herein, the node includes a cable modem termination system (CMTS) and the one or more downstream nodes include cable modems (CMs).

In some examples of the method, apparatuses, and non-transitory computer-readable medium described herein, the upstream node may be a producer or a router.

In some examples of the method, apparatuses, and non-transitory computer-readable medium described herein, the identifier includes one or more bits of a downstream service identifier (DSID).

A method at a modem termination system (MTS) is described. The method may include receiving, from a downstream node, an interest message including a content identifier indicating a content-centric network (CCN) packet, generating a hash value based on the content identifier, forwarding the interest message including the content identifier to an upstream node, receiving the CCN packet from the upstream node based on forwarding the interest message, appending the hash value to the CCN packet, and forwarding the CCN packet with the appended hash value to the downstream node.

An apparatus at a modem termination system (MTS) is described. The apparatus may include a processor, memory in electronic communication with the processor, and instructions stored in the memory. The instructions may be executable by the processor to cause the apparatus to receive, from a downstream node, an interest message including a content identifier indicating a content-centric network (CCN) packet, generate a hash value based on the content identifier, forward the interest message including the content identifier to an upstream node, receive the CCN packet from the upstream node based on forwarding the interest message, append the hash value to the CCN packet, and forward the CCN packet with the appended hash value to the downstream node.

Another apparatus at a modem termination system (MTS) is described. The apparatus may include means for receiving, from a downstream node, an interest message including a content identifier indicating a content-centric network (CCN) packet, generating a hash value based on the content identifier, forwarding the interest message including the content identifier to an upstream node, receiving the CCN packet from the upstream node based on forwarding the interest message, appending the hash value to the CCN packet, and forwarding the CCN packet with the appended hash value to the downstream node.

A non-transitory computer-readable medium for storing code at a modem termination system (MTS) is described. The code may include instructions executable by a processor to receive, from a downstream node, an interest message including a content identifier indicating a content-centric network (CCN) packet, generate a hash value based on the content identifier, forward the interest message including the content identifier to an upstream node, receive the CCN packet from the upstream node based on forwarding the interest message, append the hash value to the CCN packet, and forward the CCN packet with the appended hash value to the downstream node.

In some examples of the method, apparatuses, and non-transitory computer-readable medium described herein, the MTS may be a cable modem termination system.

A method at a router is described. The method may include receiving, from a server, configuration information for the persistent IP tunnel and communicating to a node, a request to establish the persistent IP tunnel, where the request to establish the persistent IP tunnel is based on the configuration information.

An apparatus at a router is described. The apparatus may include a processor, memory in electronic communication with the processor, and instructions stored in the memory. The instructions may be executable by the processor to cause the apparatus to receive, from a server, configuration information for the persistent IP tunnel and communicate to a node, a request to establish the persistent IP tunnel, where the request to establish the persistent IP tunnel is based on the configuration information.

Another apparatus at a router is described. The apparatus may include means for receiving, from a server, configuration information for the persistent IP tunnel and communicating to a node, a request to establish the persistent IP tunnel, where the request to establish the persistent IP tunnel is based on the configuration information.

A non-transitory computer-readable medium for storing code at a router is described. The code may include instructions executable by a processor to receive, from a server, configuration information for the persistent IP tunnel and communicate to a node, a request to establish the persistent IP tunnel, where the request to establish the persistent IP tunnel is based on the configuration information.

DETAILED DESCRIPTION

Figure 1A:
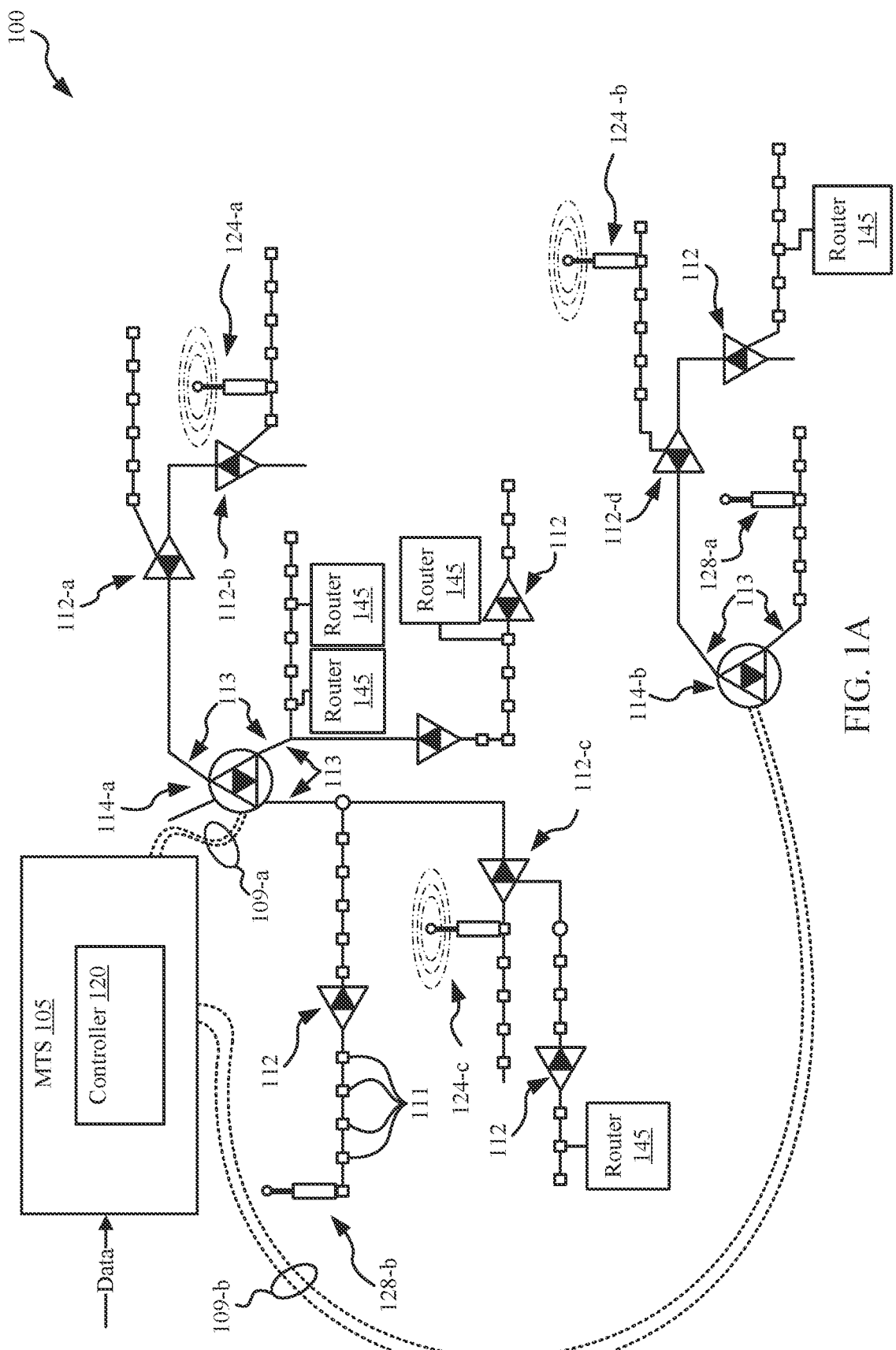
FIGS. 1A and 1B are schematic illustrations of networks in accordance with the present disclosure.

A Content-Centric Networking (CCN) system is described. The system may be configured to communicate over various network links (e.g., data over cable service interface specification (DOCSIS), ethernet, Wi-Fi, LTE (Long Term Evolution), PON (passive optical network)) and using various network protocols (e.g., CCN, Internet Protocol (IP)). The system and methods described herein relate to techniques for using CCN on a system configured for and also communicating with, different types of networking. The system may include a first node (e.g., a modem termination system (MTS), cable modem termination system (CMTS)) and one or more downstream nodes (e.g., a modem, a cable modem (CM), a router). In order to communicate using CCN, the first node may employ various techniques.

In some examples, the first node may establish a persistent IP tunnel with a downstream node (e.g., a router) and communicate CCN communications (e.g., interest messages, content objects/data packets) by the persistent IP tunnel. That is, the downstream node may establish a persistent IP tunnel (e.g., by a CM) to the first node. The downstream node may communicate interest messages by the persistent IP tunnel and receive requested content objects (e.g., data packets) from the first node by the persistent IP tunnel.

In some examples, the first node may insert, append, or include an identifier in a layer 2 frame including a CCN packet indicating one or more downstream nodes associated with the CCN packet. The identifier may allow downstream nodes (e.g., associated with the identifier) to decode the CCN packet. In a first case, the identifier may be preconfigured (e.g., by the first node). In some cases, the first node may assign more than one identifier to each of the downstream nodes where each of the identifiers corresponds to a subset of the downstream nodes. Thus, based on the downstream nodes requesting a content object, the first node may select an identifier associated with the relevant downstream nodes. In other cases, the identifier may be based on a content object name of the CCN packet. For example, the identifier may be based on a hash of the content object name.

Embodiments also contemplated exist in other communication systems capable of transporting/x-hauling traffic, for example, via a satellite operator's communication systems, a digital subscriber line (DSL) communication system and its variants (e.g., ADSL, VDSL, and SHDSL), an Optical Communication Network, a Wireless Communication Network, etc. It should also be understood that the transport/x-haul system may not be a wireline system or network. For example, it is contemplated that the transport system/network may be or utilize a wireless backhaul, fronthaul, mid-haul, x-haul technology such as but not limited to point-to-point wireless systems, point-to-multipoint wireless systems, multi-hop wireless systems, etc. such as that described by 3rd Generation Partnership Project (3GPP™) in, e.g., 3G, 4G, 5G, 6G, its variants and its future embodiments. Further, other wireless transport systems may include the Institute of Electrical and Electronics Engineers' (IEEE's) in 802.11 implemented in whole or in part in a transport/x-haul embodiment. To simplify description, a termination unit such as a CMTS, an optical network terminal (ONT), an optical line terminator (OLT), a Network Termination Units, a Satellite Termination Units, and other termination systems are collectively called an MTS. To simplify description a modem unit, such as a satellite modem, a CM, an Optical Network Units (ONU), a DSL unit, a small cell, etc. are collectively called a "modem." Further, to simplify description transport/x-haul protocols protocol such as DOCSIS, EPON, RFOG, GPON, Satellite Internet Protocol, DSL protocols, 3GPP protocol, etc. are called a "protocol." Some embodiments are described herein from a DOCSIS/Cable Technology perspective, but this is merely to simplify the description and not meant to be limiting in any way. It is contemplated that the present systems and methods may be applied to any number of networks or combination of networks, including the combination of two or more networks utilizing the present technology but having separate schedulers, such as a first DOCSIS network owned by a first operator and a second DOCSIS network owned by a second operator. The skilled artisan will be capable of reading the present disclosure and make the adaptations for the present systems and methods to be advantageously applied to the other related networks.

Features of the disclosure are initially described in the context of a network and a node as described with reference to FIGS. 1 and 2. Features of the disclosure are described in the context of systems, process flows, and an IP packet as described with reference to FIGS. 3-8. These and other features of the disclosure are further illustrated by and described with reference to an apparatus diagram and flowcharts that relate to content centric networking systems and methods as described with references to FIGS. 9-12.

FIG. 1A is a schematic illustration of a network 100 in accordance with an embodiment of the present disclosure. The network 100 may include a CMTS an MTS 105, hubs 114, amplifiers 112, routers 145, access points 128, and small cells 124. In this embodiment, MTS 105 is shown as an MTS, but may equally, optionally or additionally include a CMTS, an OLT, mobile network node (e.g., an Evolved Node B (eNodeB) or Next Generation Node B (gNodeB)) such as a small cell such as femtocells, picocells, and microcells). The hubs 114 may be an optical hub, a central office, a communications hub, or an OLT. The routers 145 may be customer premise equipment (CPE) routers or eRouters. In an embodiment, network 100 may be configured to communicate over various network links (e.g., data over cable service interface specification (DOCSIS), ethernet, Wi-Fi, LTE (Long Term Evolution), PON (passive optical network)) and using various network protocols (e.g., CCN, Internet Protocol (IP)). The network 100 may correspond to a media access control (MAC) domain downstream service group (MD-DS-SG). The MD-DS-SG may correspond to a group of devices routing communications through MTS 105.

MTS 105 may include controller 120 and may communicate with hubs 114-*a* and 114-*b* by way of optical fiber bundles 109-*a* and 109-*b* respectively. Optical fiber bundles 109 may be used to communicate both downstream communications to hubs 114 and upstream communications from MTS 105. In operation, optical fiber bundle 109 may be typically 30 km or shorter. However, according to the embodiments presented herein, greater lengths are contemplated, such as between 100 km and 1000 km. In some cases, optical fiber bundle 109 may include only a single fiber or a few individual fibers (e.g., six). In an embodiment, hubs 114 may connect with other devices by high speed cables (HSCs) 113. The HSCs 113 may include one or more taps 111. Each tap 111 may correspond to a passive device that distributes the signal on the HSC 113 to one or more downstream nodes. For example, a tap may be connected to an HSC 113 and direct the signal (e.g., by multiple lines) to a number of downstream nodes (e.g., 4, 8, 16 downstream nodes). For example, hub 114-*b* may connect with access point 128-*a* and amplifier 112-*d* by a tap 111 on an HSC 113.

Hubs 114 may be configured to direct communications for multiple technologies. That is, hubs 114 may direct optical communications as well as wireless communications. For example, network 100 may be used for point-to-point optical link based services, such as Gigabit Ethernet (e.g., used to support business services). In another example, hubs 114 may connect small cells 124 to a backhaul network (e.g., establish a wired communication between the small cells 124 and the hub 114) by HSCs 113. Alternatively, hubs 114 may connect small cells 124 to a fronthaul, midhaul or x-haul network, depending on the network configuration and/or coupling. Small cells 124 have been included for explanatory purposes only and network 100 may include one or more small cells 124 or no small cells 124.

Network 100 may include one or more amplifiers 112. The amplifiers 112 may be used to amplify signals being communicated by an HSC. For example, amplifier 112-*a* and 112-*b* may be used to amplify a signal between hub 114-*a* and small cell 124-*a*. In some cases, a number or placement of amplifiers 112 may be based on a number of factors such as a length of HSC, a type of signal being communicated on the HSC, or an amount of noise associated with the signals being communicated on the HSC. Each HSC 113 may be characterized by the number of amplifiers 112 on the line. For example, the HSC 113 from the hub 114-*a* to the access point 128-*b* may be an N1 line (e.g., corresponding to one amplifier 112). In another example, the HSC 113 from hub 114-*a* to small cell 124-*a* is an N2 line (e.g., corresponding to two amplifiers 112).

MTS 105 and hubs 114 may be configured to multiplex and aggregate services over fiber access networks, such as but not limited to a cable access network and other access networks. For example, MTS 105 may receive downstream communications and determine to direct (e.g., by controller 120) the downstream communications by optical fibers 109 to one or more of the hubs 114. The downstream communications may carry DOCSIS channels, digital video, analog video channels, channels with telemetry information, set top box control channels, IP protocol data, CCN protocol data, over-the-top data, telephony channels, and any other data that may be carried over digital and analog networks. Hubs 114 may receive and aggregate upstream communications from routers 145, access points 128, or small cells 124. The upstream communications may include DOCSIS channels, set top box return channels, upstream telemetry, and telephony channels. In some examples, the routers 145, access points 128, or small cells 124 may be associated with homes, businesses, and so forth. In some other cases, a hub 114 and downstream device (e.g., a router 145) may be integrated as a single device, such as a modem, which may be located at or near a customer premises.

Network 100 may be configured for a first type of networking (e.g., IP networking over DOCSIS). In some cases, the network 100 may be configured to additionally communicate using a second type of networking (e.g., CCN). In a first example (e.g., network 100 is an IP networking over DOCSIS system), the MTS 105 may establish a persistent IP tunnel with a downstream router 145 and communicate CCN communications (e.g., interest messages, content objects/data packets) by the persistent IP tunnel. In some cases, the MTS 105 may include a tunnel endpoint. Here, the persistent IP tunnel may be established between the persistent IP tunnel and the router 145. In a second example, the MTS 105 may include (e.g., insert or append) an identifier to a layer 2 frame including a CCN packet indicating one or more routers 145 associated with the CCN packet. Here, the identifier may be preconfigured (e.g., by the MTS 105) or based on a content object name of the CCN packet.

Figure 1B:
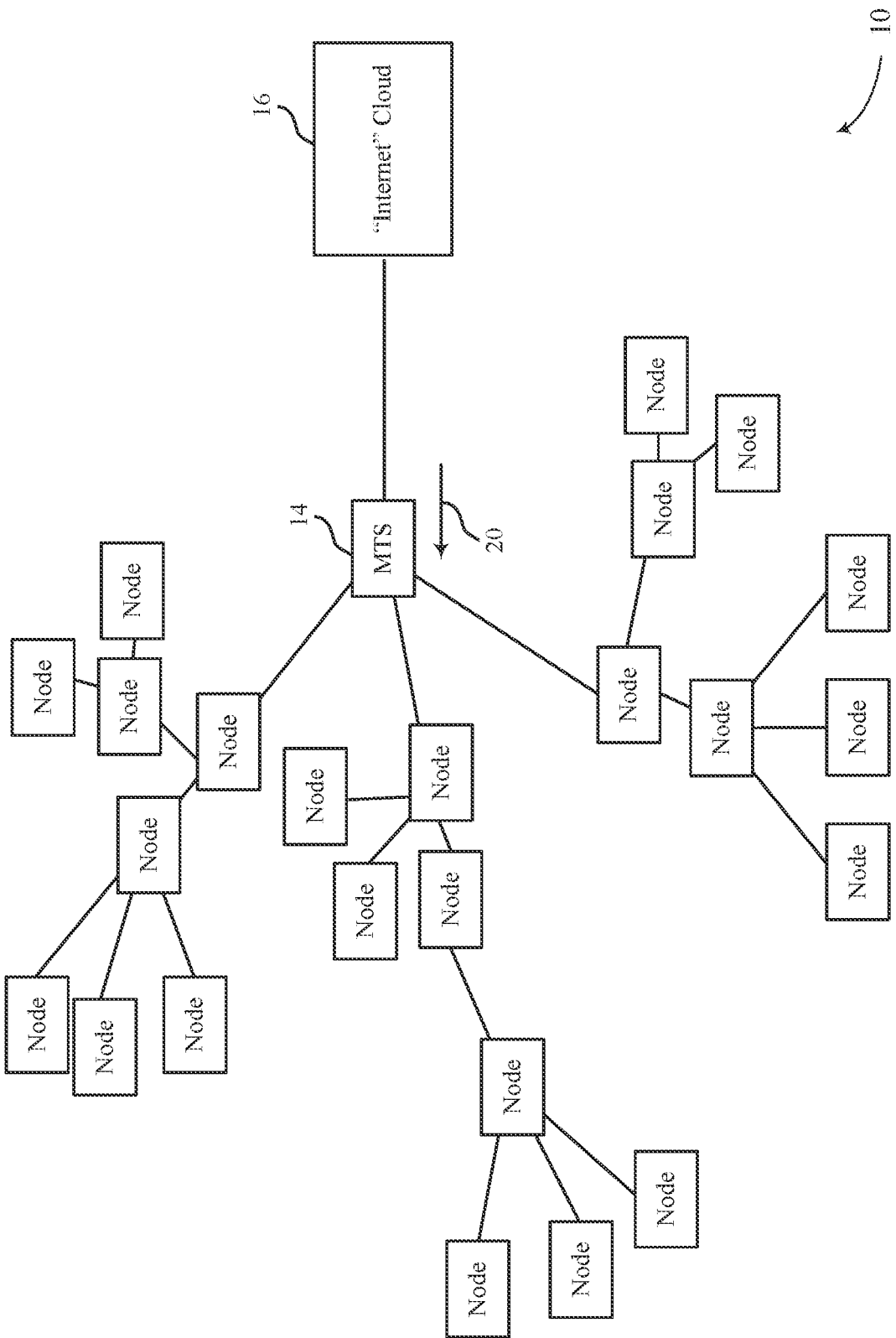

FIG. 1B is a schematic illustration of a network 10 in accordance with an embodiment of the present disclosure. The network 10 may include nodes and a wireless or wired medium. The nodes may be examples of a router, an MTS, a CMTS, a CM, an OLT, a small cell, a fiber node, a hub, or a client device (e.g., a user equipment (UE), laptop). The nodes may be in communication with each other by the connections indicated by the solid lines. In some cases, the connections may be wireless. In some other cases, the connections may be physical connections. For example, one or more of the nodes be connected by optical fibers or coaxial cables.

The network 10 may illustrate a plurality of nodes configured to facilitate forwarding messages for clients (not shown in FIG. 1) connected thereto or otherwise associated therewith, e.g., each node may be configured to facilitate routing, forwarding, relaying, processing or otherwise exchanging upstream and downstream signaling for one or more clients associated therewith. The network 10 may include MTS 14 which may be an example of a CMTS. In some cases, MTS 14 may be referred to as an edge node. The MTS 14 may be connected to the "Internet" Cloud 16 via a wired or wireless medium. The MTS 14 may enable downstream nodes (e.g., nodes in the downstream direction 20 of MTS 14) to communicate with the "Internet" Cloud 16. For example, the MTS 14 may be a CMTS and one or more of the downstream nodes may be CMs. A CM may be located at a household or a business in order to provide internet connectivity to the household or business. Each of the CMs may be in communication with one or more client devices. Thus, the upstream nodes may connect the downstream nodes to the "Internet" Cloud 16 by wired (e.g., optical cable, coaxial cable) or wireless connections.

The illustrated arrangement of nodes may be similar to the branching structure commonly employed in communications systems such as cable systems, optical communications systems, any other appropriate communications system or combination thereof (which may be examples of network 10). In some examples, the branching structure of cable systems may facilitate communications between inside nodes (e.g., a CM) and an MTS 14 (e.g., a CMTS), which may be referred to as a Hybrid Fiber-Coaxial (HFC) network. A fiber portion of the HFC network/branching structure connects each CMTS to multiple fiber converters located in particular neighborhoods or other geographically spaced areas (converters shown as black boxes). The fiber converters may be configured to convert between optical signaling used on corresponding fiber links to the MTS 14 to the electrical signaling used on the coax feeders and drops that reach the individual nodes, e.g., the households and CMs of the last mile. In some examples, there may be nodes connected upstream of the MTS 14 which may also be edge nodes to other nodes connected downstream therefrom or other nodes operable in accordance with the contemplated content/name/information centric networking.

The network 10 may be an example of a network that facilitates message routing according to named data networking (NDN) or information-centric networking (ICN) and possible implementations according to CCN principles. The network 10 may be configured to operate in a manner commensurate with the processes, messaging and other operations described within CCNx Semantics (draft-irtf-icnrg-ccnxsemantics-09) as published by The Internet Engineering Task Force (IETF), Jun. 27, 2018, and/or CCN 1.0 Protocol Architecture as published by Marc Mosko, Ignacio Solis, Ersin Uzun of the Palo Alto Research Center, the disclosures of which are hereby incorporated by reference in their entireties herein.

In the CCN or NDN protocol, communication is achieved by an application sending an interest message (e.g., an interest packet, an interest) that may identify, by name, a piece of content (e.g., a data packet, a content object) that it wishes to receive. For example, the network 10 may communicate CCN messages by a cable network (e.g., network 10). The network 10 (e.g., operating according to CCN principles) may route interest messages toward a producer of content corresponding to the name (e.g., of the piece of content) in the interest message, leaving a "breadcrumb" trail of states in the routers along that path. That is, each of the routers may include an indication of a downstream node or link that the interest message was received from. Therefore, once the interest message arrives at a node where the named piece of content is present (e.g., a content producer) that node may return a content object message containing the named piece of content (e.g., the data packet, the content object). The content object may follow the "breadcrumb" trail back to the originating application. This process is commonly referred to as stateful forwarding. That is, each node associated with the path of the interest message (and subsequently the content object) may include a state of where the interest message originated from. An application that may send interest messages may be referred to as a consumer, whereas an application that may send content object messages (e.g., in response to interest messages) may be referred to as a producer.

Producers may advertise the name prefixes for the content that they can provide, and this information may be propagated to the routers (or other nodes) of the network 10, much in the same way that IP prefixes may propagate to routers in an IP network. However, consumers may not advertise their presence or location and can simply send interest messages from the corresponding location in the network 10, and the resulting content objects may make it back to them via the stateful forwarding process. Further, a consumer that is mobile can redirect data in flight to its new location by resending interest messages for those in-flight content objects using its new network attachment point. As a result, mobile consumer applications (which would be the majority of mobile applications) may be handled elegantly by the CCN protocol.

In addition, if a mobile device has multiple network attachment points, e.g., both a Wi-Fi and a 5G/LTE connection, it can choose to send interest messages via both of those network paths. This capability can be used to enable higher capacity (by load balancing the interest messages in an attempt to fully utilize multiple links simultaneously), higher reliability (by sending each interest message on multiple links), or seamless handover (by switching to a new link for all future interest messages, while still waiting to receive content objects on an older link).

CCN/NDN provides native and elegant support for client mobility, multipath connectivity, multicast delivery and in-network caching; many of which are critical for current and future networks, and all of which may require inefficient and/or complex managed overlays when implemented in IP. In general, CCNs may provide some advantages over IP networking that make it attractive as a replacement for IP for wireless networking. In particular, by employing stateful forwarding, CCN may support information retrieval by mobile client devices without a location registration protocol. Further, CCN supports a client device utilizing multiple network attachments (e.g., multiple radio links) simultaneously in order to provide greater reliability or greater performance Finally, CCN may be optimized for content retrieval, where content can be easily retrieved from an on-path cache.

The CCN/NDN technology may include two packet types, an "interest" packet and a "data" packet (while both CCN/NDN use the term "interest," CCN refers to the data packet as a "content object"). In some examples, a request may be communicated for a piece of content to occur, with issuance of an interest and a response thereto, e.g., delivery of the requested piece of content, to occur with issuance of a content object, although its use and application may be implemented with various types of protocols, messaging or nomenclatures. An interest message may be used to identify the resource, e.g., piece of content, that is being requested, which may be identified by a name that includes provenance. In some cases, the name specifically, may identify a specific content object, and in other cases it may contain wildcards that indicate that any of a set of content objects may satisfy the request. For example, the interest message may indicate the content for a website.

A client device may launch a request, such as an interest message, packet, message, and so forth, into the network 10, and may receive a corresponding content object in response. The interest message may not include identifying information for or identify the client or sender. Instead, the interest or interest message may include other fields to refine the request and allow the appropriate content to be transmitted back to the client or sender. NDN provides several "selectors" for this purpose and CCN includes additional optional fields such as a content object hash and a KeyID. A content object may include the name of the resource, piece of content, and so forth, included therein. In one example, a content object may be uniquely named by the name field. The content object may be an entire resource (e.g., content, data packet, content object), or a small fragment of one, but in either case, it is uniquely identified by the name field. In addition to the name field and the resource itself, the content object contains either a hash or a digital signature that can be used by a recipient to verify provenance. In the case of NDN, each content object may contain a digital signature along with an identifier of the signing key, which allows the packet to be validated by any node in the network. CCN introduces the possibility of using a content object hash, which can be used along with other information to establish provenance as will be described further herein.

Structuring names for data objects may be approached in various manners, including whether names may be hierarchical or flat. In CCN/NDN names may be composed of an arbitrary-length prefix, which may be hierarchical, followed by a portion that may or may not be hierarchical. CCN/NDN names commonly resemble a URL, e.g., cablelabs.com/specs/main.html, however the resemblance is largely superficial, because the first element may not be intended to be a domain name servers (DNS) resolvable name, and a name may not be human-readable. The use of a hierarchical prefix may allow for route aggregation in intermediate routers, which may simplify routing. The CCN/NDN architecture may include a trust model for validating packet signatures. Every device that is capable of acting as a source of information, which may generally include networked devices, may need one or more certificates to authenticate its content to others, as well as to announce itself to the network as an authoritative source.

One aspect of the network 10 using CCN is that the network 10 may handle "flash-crowd" events efficiently via the distributed cache and multicast-like distribution system. Since the interests from multiple, simultaneously interested clients may become aggregated at a node (e.g., within a pending interest table (PIT) to be described in more detail below) as they flow toward the content origin. The resulting content object forwarding may be automatically performed in an efficient, multicast-like way with each node replicating the packet to as many faces (e.g., by as many interfaces) as needed, but sending only one copy on each face. Further, even in the case that interests are not simultaneous, if each router node in the network may cache the popular content object, the forwarding tree is just as efficient (except in the case of a shared final link, where multiple copies of the content object would be sent). In addition to significantly reducing the network burden of handling these types of events, it massively reduces the burden on the origin server, because in theory, it may only send one copy of any content object into the network. This in-line caching also allows very efficient recovery from packet loss. While it may require that the client time-out and re-send its interest, the content object does may not be retrieved from the original location, only from node immediately preceding the loss.

Network 10 may be configured for a first type of networking (e.g., IP networking over DOCSIS). In some cases, the network 10 may be configured to additionally communicate using a second type of networking (e.g., CCN). The network 10 may include a first node (e.g., an MTS) and one or more downstream nodes (e.g., a CM, a router). In order to communicate using CCN, the first node may employ various techniques. In a first example (e.g., in an IP networking over DOCSIS system), the first node may establish a persistent IP tunnel with a downstream router and communicate CCN communications (e.g., interest messages, content objects/data packets) by the persistent IP tunnel. In a second example, the first node may insert, append, or include an identifier to a layer 2 frame including a CCN packet indicating one or more downstream nodes associated with the CCN packet. Here, the identifier may be preconfigured (e.g., by the MTS) or based on a content object name of the CCN packet.

Figure 2:
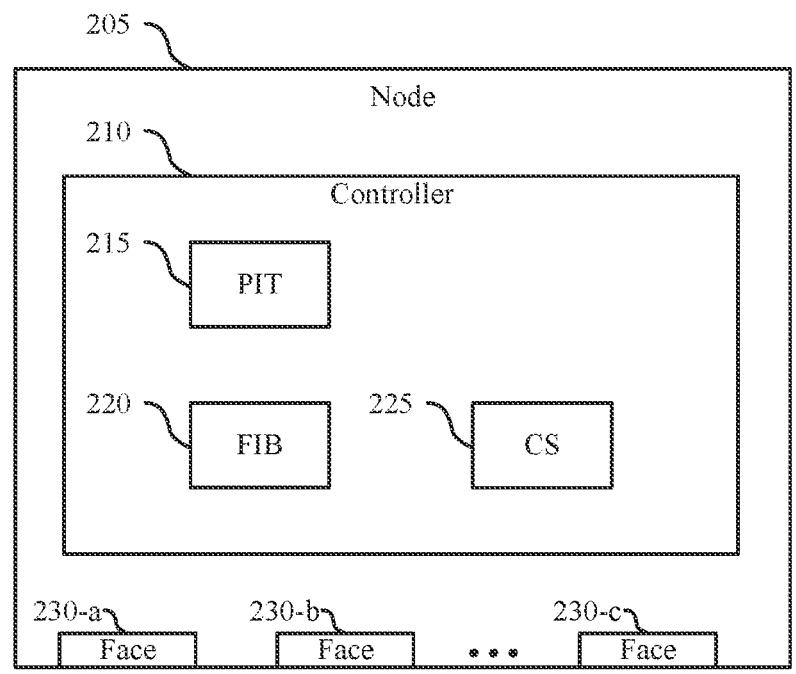
FIG. 2 is a schematic illustration of a node in accordance with the present disclosure.

FIG. 2 is a schematic illustration of a node 205 in accordance with an embodiment of the present disclosure. The node 205 is predominately described as a standalone entity configured to facilitate forwarding, routing or otherwise facilitating signaling between upstream and downstream faces 230 capable of interacting with wired and/or wireless communication media. The node is intended to generally refer to any entity distributed in a networked environment capable of operating in accordance with the described architectures, protocols and messaging associated with content/name/information centric networking, e.g., capable of facilitating non-IP-based communications (although in some circumstances the node 205 may be configured to also support optionally IP-based indications). The node 205 may include a controller 210 for controlling the operation thereof. The controller 210 may further include a PIT 215, forwarding information base (FIB) 220, and CS 225.

While the purpose of a node 205 in CCN/NDN (e.g., a router) may have functional similarities to an IP node (e.g., moving packets closer to the intended recipient), the functions of a node 205 in CCN/NDN differ considerably from those of an IP node. A CCN/NDN node 205 may include a set of faces 230. The term "face" is used as a more general replacement for "interface", as the term "face" may include physical and logical interfaces, and also may include the applications that may reside on the node.

To manage packet forwarding, the node 205 may maintain at least three data structures which may include a PIT 215, a FIB 220, and a content store (CS) 225. The PIT may store an indication of data packets requested (e.g., by a downstream node) that have not been fulfilled yet. The PIT may include an indication of the content object name as well as an indication of the downstream node it was received from. For example, the PIT may include an indication of the face 230 by which the interest message was received. The CS may indicate the data packets being stored at a cache of the node 205. The FIB 220 may be configured to map name prefixes to faces and to use a longest match approach. The longest match approach may be conceptually similar to IP routing. For the longest match approach, the FIB 220 may compare the most significant name components of the content object name (e.g., included in an interest message) to stored prefixes and may determine the longest match based on the prefix with the greatest number of matching most-significant name components. Thus, the FIB 220 may determine the appropriate FIB 220 entry for a particular interest message. The FIB 220 entry may identify multiple faces 230 on which the interest could be forwarded. Making decisions about which face 230 to use in this situation is a function of a "strategy" layer within the node. The strategy could deterministically select a face 230 based on history of response times, link cost, or other criteria. Alternatively it could stochastically select a face 230, perhaps weighting its selection based on these criteria, in order to load-balance traffic to multiple content sources.

The strategy layer may be allowed to send the interest message out multiple faces 230. While this "fanning out" of interests is not expected to be used frequently (lest the network be overcome with proliferating interests), it may enable the network to quickly locate the nearest copy of a content object, as well as to move the interest message closer to the content origin in the absence of a converged routing topology. When a content object arrives on a particular face 230, the node 205 checks its PIT 215 to see if any faces have requested the packet. If so, it forwards a copy of the content object to the indicated face(s) 230, deletes the PIT 215 entry, and optionally stores the content object in the CS 225. Thus, when an interest message is launched into the network by a client (e.g., a downstream node), it may traverse several intermediate nodes 205, and potentially be fanned out in different directions. At each intermediate node 205, a PIT 215 entry is created identifying, for that node 205, which direction to send the corresponding content object when it arrives. Once a node 205 identifies that it has the content object in its CS 225, or can respond to the interest message itself (via a resident application), the content object follows the breadcrumb trail of PIT 215 entries created by the interest back to the client that initiated it. Every node 205 in the network may check the digital signature of each content object, and discard any invalid packets. In general, the end client may be expected to perform this validation, as would any intermediate node 205 that caches the content object. In CCN, if the content object has a content object hash, each node 205 may validate the hash and discard the packet if it does not validate.

In some cases, the node 205 may receive an interest, or interest message, from a downstream node (e.g., by one of the faces 230-a, 230-b, or 230-c). The interest message may include a name of a content object. The controller 210 may first check the CS 225 to determine if a matching data packet (e.g., matching the content object indicated by name in the interest message) is already present in cache (e.g., at a memory of the node 205). If the data packet is stored at in cache, the node 205 may communicate the data packet back to the downstream node by the same face 230 (e.g., as the interest message was received from).

If the data packet is not present in the CS 225, the controller 210 may check the PIT 215 to determine if a second downstream node has already requested the data packet. In some cases, the controller 210 may check the CS 225 for the data packet and subsequently check the PIT 215 for the data packet. In other cases, the controller 210 may check both the CS 225 and the PIT 215 concurrently. If the name of the content object is already in the PIT 215, the controller 210 may add the face 230 corresponding to the face 230 by which the interest message was received (e.g., face 230-a) to the PIT 215. This may occur if the node 205 receives multiple interest messages (e.g., from more than one downstream node) requesting the same data packet. In some cases, the interest messages may be received from the same face 230-a. In some other cases, the interest messages may be received from multiple faces 230-a and 230-b. Alternatively, the controller 210 may determine that a second downstream node has not already requested the data packet. In this example, the controller 210 may add the face 230-a to the PIT 215 and forward the interest message to an upstream node based on a face 230 indicated by the FIB 220 (e.g., based on a longest match of the data packet).

When the data packet arrives at the node 205 (e.g., by the same face 230 indicated by the FIB 220), the controller 210 may check the PIT 215 to determine if any of the faces 230 have requested the data packet. If a face 230 (e.g., face 230-*a*) has requested the data packet, the node 205 may communicate the data packet to one or more downstream nodes by the face 230-*a*. In a first example, the node 205 may communicate the data packet to a downstream node by a persistent IP tunnel (not illustrated in FIG. 2). Here, the downstream node may also communicate interest messages to the node 205 by the persistent IP tunnel. Although the term tunnel may be used herein, generally a tunnel may be a communications channel between two or more networks and may be used to transport another network protocol by encapsulating its packets. The persistent IP tunnel will be discussed in further detail herein.

In a second example, the node 205 may communicate over one or more links that may not be CCN-specific (e.g., a DOCSIS link). Here, the controller 210 may include (e.g., insert, append) an identifier (e.g., a downstream service identifier (DSID)) to the data packet prior to communicating the data packet by the one or more links to the downstream node(s). The identifier may be specific to either the downstream node(s) or the data packet. Therefore, the downstream node(s) may detect and/or decode the data packet based on the included identifier. Regardless, the node 205 may allow for cable internet service providers (ISPs) to use CCN without changing an underlying implementation of the client equipment (e.g., DOCSIS equipment).

Figure 3:
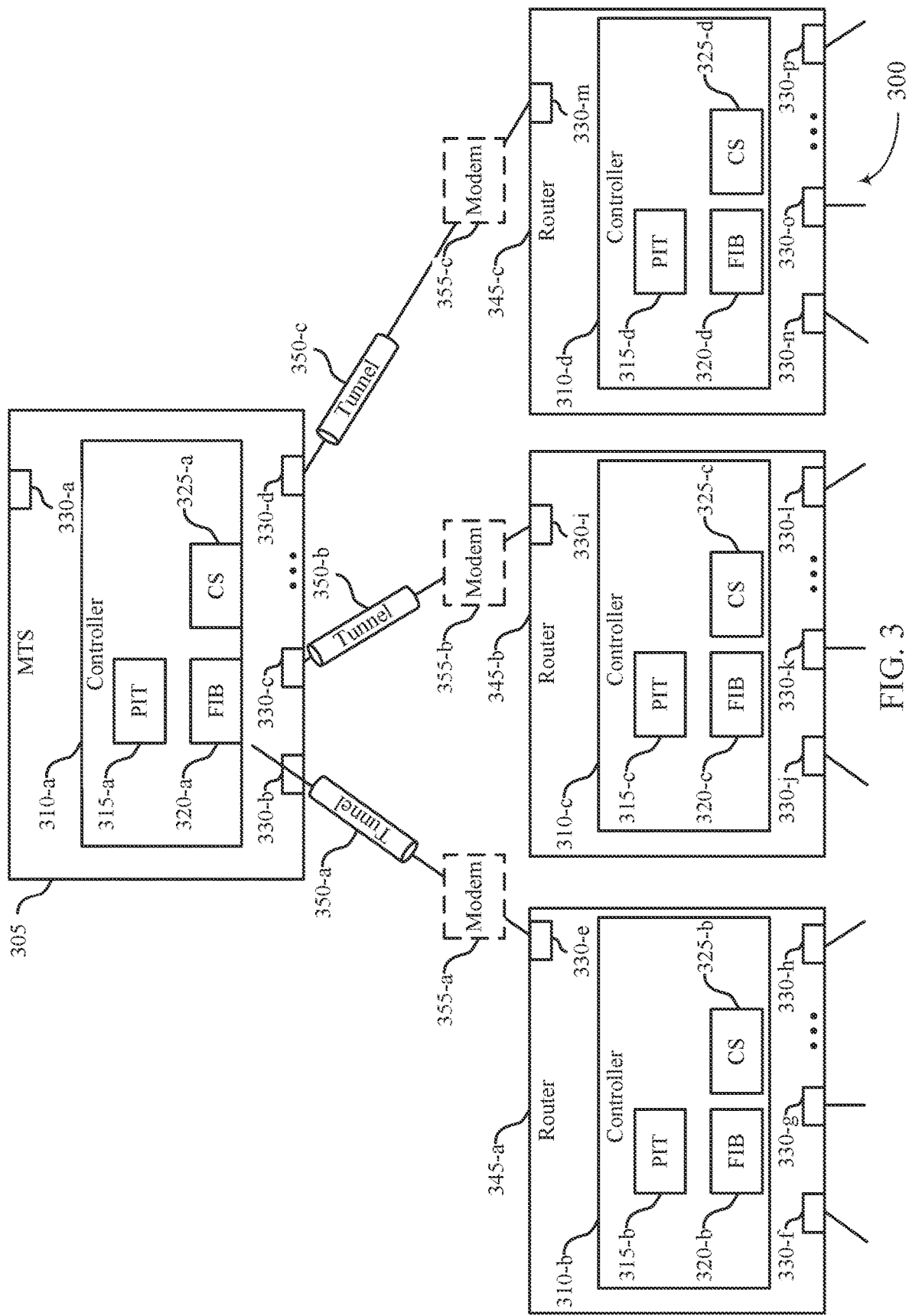
FIG. 3 is a schematic illustration of a system in accordance with the present disclosure.

FIG. 3 is a schematic illustration of a system 300 that supports CCN systems and methods in accordance with an embodiment of the present disclosure. System 300 may include a CMTS an MTS 305, modems 355-*a*, 355-*b*, and 355-*c*, and routers 345-*a*, 345-*b*, and 345-*c*. In this embodiment, MTS 305 is shown as an MTS, but may equally, optionally or additionally include a CMTS, an OLT, mobile network node (e.g., an Evolved Node B (eNodeB) or Next Generation Node B (gNodeB)) such as a small cell such as femtocells, picocells, and microcells). The routers 345 may be CPE routers or eRouters. In some cases, the MTS 305 may be an example of one or more nodes as described with reference to FIGS. 1 and 2. Further, in this embodiment the modems 355 may be shown as modems, but may equally, optionally or additionally include a cable modem (CM), a DSL modem, an ONT, or a small cell. The MTS 305 and the routers 345 may include faces 330, controllers 310, PITs 315, FIBs 320, and CSs 325 which may include aspects of the nodes as described with reference to FIGS. 1 and 2.

The MTS 305 may be a node configured to communicate using various network protocols including CCN or IP. The MTS 305 may be configured to communicated over various network links including DOCSIS, ethernet, Wi-Fi, LTE, or PONs. The routers 345-*a*, 345-*b*, and 345-*c* may also be configured for a corresponding type of networking (e.g., IP networking over DOCSIS or CCN over DOCSIS). Communicating via CCN, may include establishing tunnels 350 by each of the routers 345, for CCN communications with the MTS 305. The tunnels 350 may allow for CCN communications through modems 355 and between the MTS 305 and each of the routers 345-*a*, 345-*b*, and 345-*c*. To communicate by the tunnels 350, the MTS 305 and the routers 345 may encapsulate all communications (e.g., interest messages, data packets) within a packet format native to the type of networking that is native to MTS 305 and routers 345-*a*, 345-*b*, and 345-*c* (e.g., IP networking over DOCSIS). For example, the CCN data packets may be encapsulated by IP packets such that the system 300 may detect IP networking communications instead of CCN communications. When the MTS 305 and the routers 345-*a*, 345-*b*, and 345-*c* communicate by the tunnels 350-*a*, 350-*b*, and 350-*c* respectively, the encapsulated data packets may be routed through modems 355-*a*, 355-*b*, and 355-*c* respectively. The modems 355-*a*, 355-*b*, and 355-*c* may forward the data packets (e.g., without decoding or detecting any content within the tunnels 350) to the MTS 305. The system 300 (e.g., including the MTS 305, routers 345, and tunnels 350) may be an example configuration and there may be variations from this configuration. For example, there may be multiple modems 355-*a*, 355-*b*, and 355-*c* (and corresponding routers 345) communicating with the MTS 305 by a single face 330.

The MTS 305 may receive an interest, or interest message, from a downstream node (e.g., one of the routers 345-*a*, 345-*b*, or 345-*c*) and by a tunnel 350. For example, the MTS 305 may receive an interest message from router 345-*b* by face 330-*c*. Here, the router 345-*b* may receive an interest message indicating the data packet (e.g., from a downstream node by faces 330-*j*, 330-*k*, or 330-*l*). The router 345-*b* may determine that the data packet is not stored at CS 325-*c* and does not correspond to any pending requests (e.g., based on data packets indicated within PIT 315-*c*). Because the router 345-*b* determined that the data packet is not stored at CS 325-*c*, the router 345-*b* may simply forward the interest message to the MTS 305. Alternatively, the router 345-*b* may determine a need for a data packet (e.g., based on an interest message from one or more client devices received by faces 330-*j*, 330-*k*, or 330-*l*). Because the router 345-*b* determined that the data packet is not stored at CS 325-*c*, the router 345-*b* may generate the interest message including the name of the content object (e.g., the data packet) and send the interest message by face 330-*i* (e.g., based on the FIB 320-*c*) to the MTS 305.

When the MTS 305 receives an interest message from router 345-*b* by tunnel 350-*b* (and forwarded by modem 355-*b*), the MTS 305 may first determine whether the requested data packet is present (e.g., at the CS 325-*a*). If the data packet is not present in the CS 325-*a*, the MTS 305 may check the PIT 315-*a* to determine if a second router 345 (e.g., router 345-*a* or 345-*c*) has already requested the data packet. If the name of the data packet is already in the PIT 315-*a*, the MTS 305 may add the face 330-*b* (e.g., corresponding to the face 330-*b* by which the interest message was received) to the PIT 315-*a*. Alternatively, the MTS 305 may determine that a second router 345 has not already requested the data packet. Here, the MTS 305 may add the face 330-*b* to the PIT 315-*a* and forward the interest message to an upstream node (e.g., by face 330-*a*) based on a face 330-*a* indicated by the FIB 320-*a* (e.g., based on a longest match of the data packet).

When the data packet arrives at the MTS 305 by the face 330-*a*, the MTS 305 may check the PIT 315-*a* to determine if any of the faces 330 have requested the data packet. If a face 330 (e.g., face 330-*b* and 330-d) has requested the data packet, the MTS 305 may communicate the data packet to the corresponding routers 345-*b* and 345-*c* by the tunnels 350-*b* and 350-*c*.

Figure 4:
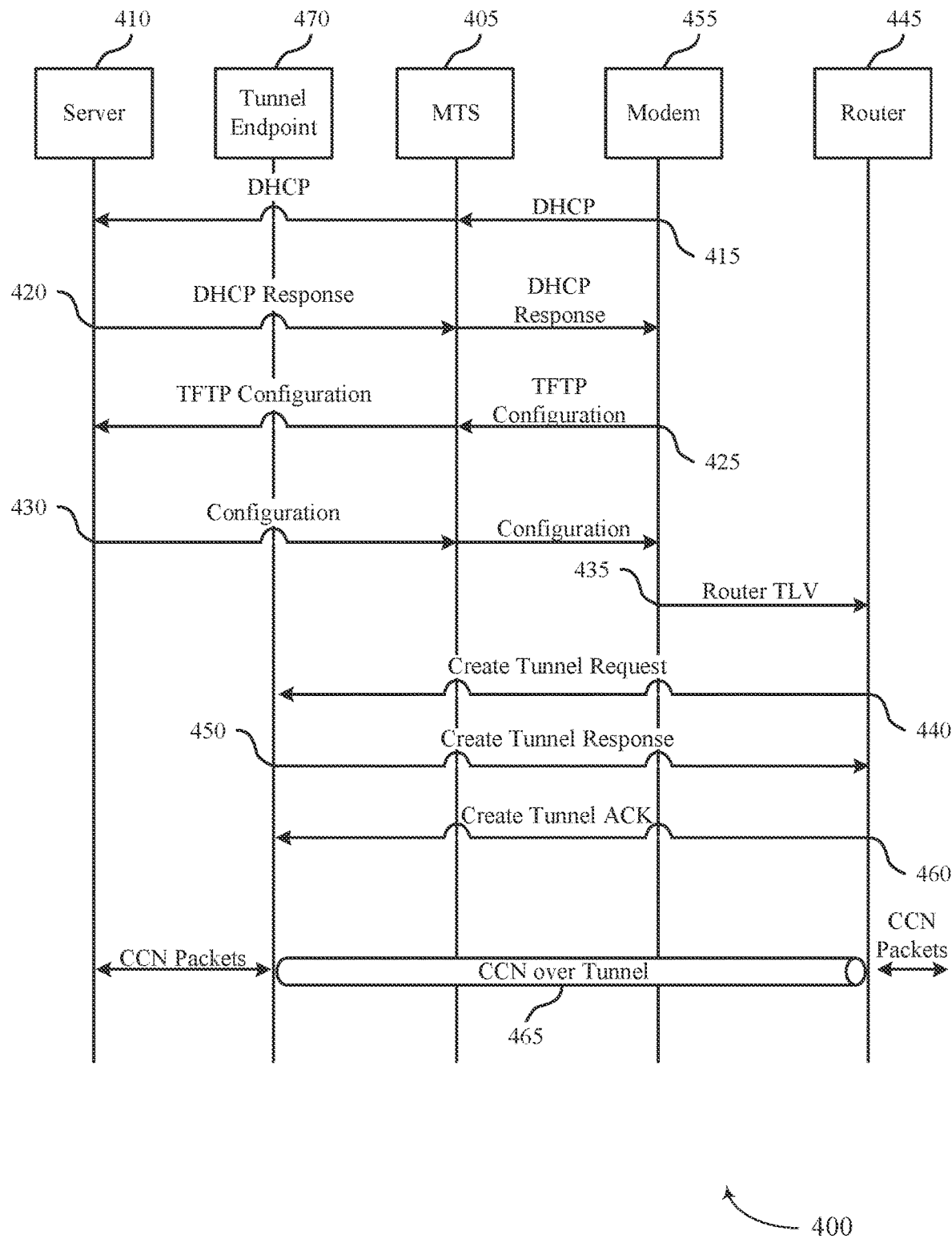
FIG. 4 is a process flow in accordance with the present disclosure.

FIG. 4 is a process flow 400 that supports CCN systems and methods in accordance with an embodiment of the present disclosure. The process flow 400 may implement aspects of network 10, node 205, and system 300 as described with reference to FIGS. 1 through 3. The process flow 400 may include operations performed by a server 410, tunnel endpoint 470, MTS 405, modem 455, and router 445. In this embodiment, MTS 405 is shown as an MTS, but may equally, optionally or additionally include a CMTS, an OLT, or a mobile network node (e.g., eNodeB or gNodeB) as in a small cell such as femtocells, picocells, and microcells. In some cases, the MTS 405 may be an example of one or more nodes as described with reference to FIGS. 1 and 2 or the MTS as described with reference to FIG. 3. Further, in this embodiment the modem 455 may be shown as a modem, but may equally, optionally or additionally include a cable modem (CM), a DSL modem, an ONT, or a mobile UE. The tunnel endpoint 470 and the MTS 455 may be one unit, or may be two independent network elements. The server 410, MTS 405, modem 455, and router 445 may be configured for a first type of networking (e.g., IP networking over DOCSIS) and may utilize a tunnel (e.g., a persistent IP tunnel) established in accordance with the first type of networking to communicate between the MTS 405 and the router 445 according to a second type of networking (e.g., CCN).

At 415, the modem 455 may transmit a dynamic host configuration protocol (DHCP) message to MTS 405, which may subsequently forward the DHCP to a server 410. The DHCP message may be a DHCP discover message and may correspond to a message from the modem 455 to request an IP address from the server 410.

At 420, the server 410 may transmit a DHCP response to the modem 455 by the MTS 405 (e.g., the MTS forwards the DHCP response to the modem 455). The DHCP response may include an IP address for the modem 455 and an IP address for the server 410. The DHCP response may further include a configuration file name. In some cases, the server 410 and modem 455 may exchange one or more additional messages regarding the DHCP. For example, the modem 455 may transmit a request message to the server 410 requesting the indicated IP address for the modem 455. The server 410 may response with an ACK (acknowledgment) message to the request message.

At 425, the modem 455 may request the configuration file by trivial file transfer protocol (TFTP).

At 430, the server 410 may transmit the configuration file to the modem 455. The configuration file may indicate to the modem 455 how the data service is configured. The data service may refer to the service or connection between the MTS 405 and the modem 455 (e.g., the user's broadband service configuration). The configuration file may include some configuration options (e.g., for a downstream node such as router 445).

At 435, the modem 455 may communicate the configuration options to the router 445 by using type-length-value (TLV) encoding. The router TLV may include a tunnel address for a CCN tunnel (e.g., such as tunnels 350 as described with reference to FIG. 3). The tunnel address may correspond to an address for the tunnel endpoint 470.

At 440, the router 445 may communicate a create tunnel request to the tunnel endpoint 470. The router 445 may communicate the create tunnel request to the tunnel endpoint 470 by a link layer or IP layer. The IP or link layer may be in a full stack or split architecture. In a split stack architecture, a first portion of the stack may be in the router 445 and a second portion of the stack may be in the tunnel endpoint 470. The router 445 may communicate the create tunnel request based on the tunnel address for the CCN tunnel included within the router TLV (e.g., at 435). At 450, the tunnel endpoint 470 may send a create tunnel response message, which the router 445 may acknowledge at 460.

Based on the communications at 440, 450, and 460, a tunnel (e.g., an IP tunnel, a persistent IP tunnel) may be established between the tunnel endpoint 470 and the router 445. At 465, the router 445 and the tunnel endpoint 470 may communicate CCN packets (e.g., interest messages, content objects, etc.).

Figure 5:
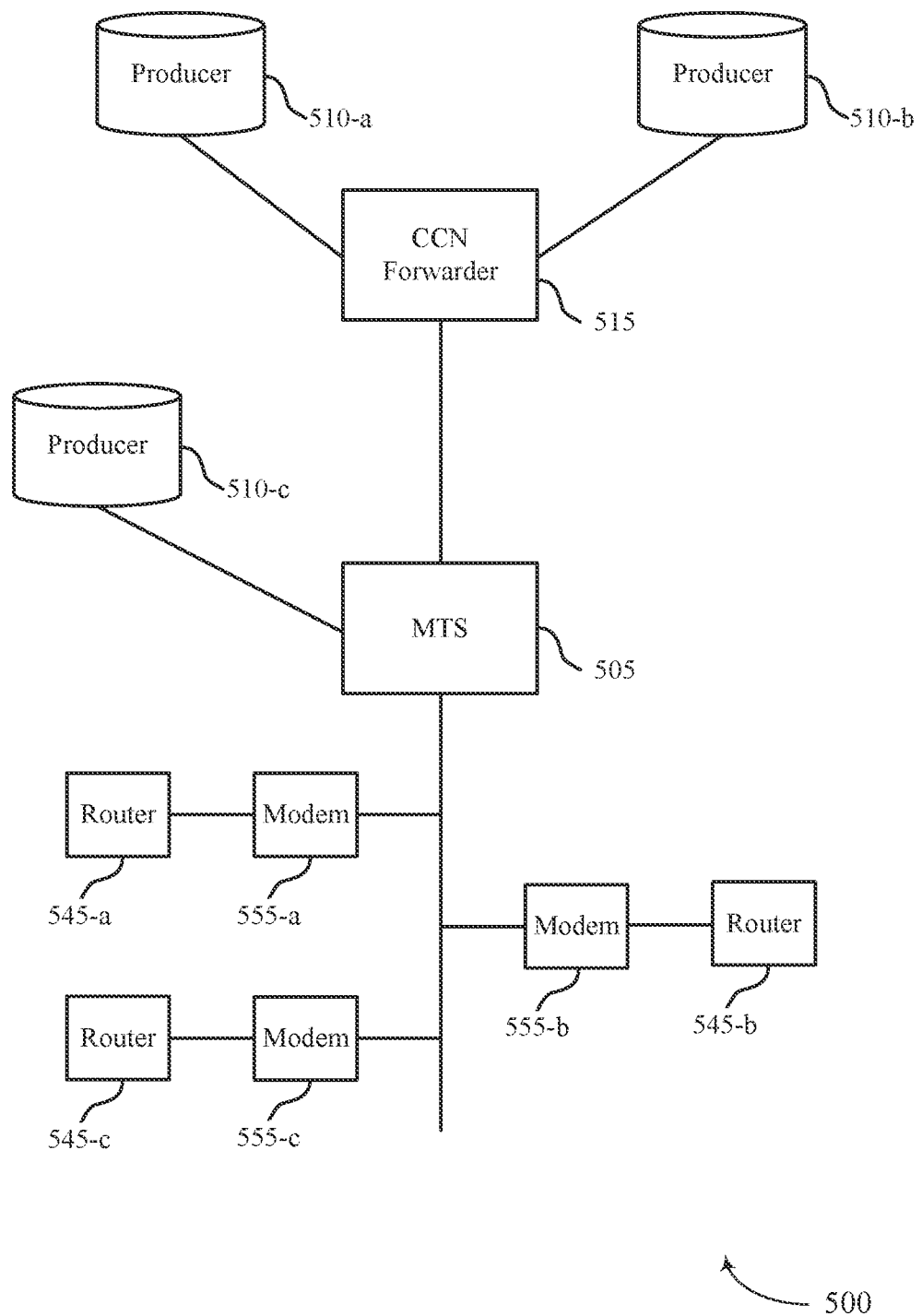
FIG. 5 is a schematic illustration of a system in accordance with the present disclosure.

FIG. 5 is a schematic illustration of a system 500 that supports CCN systems and methods in accordance with an embodiment of the present disclosure. System 500 may include a CCN Forwarder 515, MTSs 505, producers 510-a, 510-b, and 510-c, modems 555-a, 555-b, and 555-c, and routers 545-a, 545-b, and 545-c. The CCN Forwarder 515 and MTS 505 may be examples of the nodes as described with reference to FIGS. 1 and 2. Further, MTS 505 may be examples of MTSs as described with reference to FIGS. 3 and 4. In this embodiment, MTS 505 is shown as an MTS, a CMTS, but may equally, optionally or additionally include a CMTS, an MTS, an OLT, or a mobile core. The producers 510 may be similar to nodes (e.g., as described with reference to FIGS. 1 and 2) and may only send data packets (e.g., content objects). Modems 555-a through 555-c may be examples of one or more nodes as described with reference to FIG. 1 (e.g., inside nodes). In some cases, modems 555 may be a part of a same MD-DS-SG. And MD-DS-SG may correspond to a set of downstream channels between the MTS 505 and modems 555. In most cases, an operator will configure all downstream channels reaching a fiber node to the same MAC Domain. Often times, MD-DS-SGs are configured such that they are shared by many modems 555. That is, the modems 555 may communicate with the MTS 505 by a same communications link.

The system 500 may be configured for a first type of networking (e.g., DOCSIS). For example, the links between the MTS 505 and the modems 555-a, 555-b, and 555-c may correspond to links for the first type of networking. In some cases, the MTS 505 and the modems 555-a, 555-b, and 555-c may communicate using a second type of networking (e.g., CCN) by including (e.g., appending, inserting) an identifier in accordance with the first type of networking to data packets communicated between the MTS 505 and the modems 555-a, 555-b, and 555-c. For example, if the first type of networking is DOCSIS, the identifier may correspond to a DSID. The DSID may be a 20-bit value contained in a DOCSIS downstream service header on a fame that identifies a stream of packets to a set of modems 555. The modems 555 may use the DSID for downstream resequencing, filtering, and forwarding (e.g., to one or more routers 545).

Each of the modems 555-a, 555-b, and 555-c may be in communication with one or more routers 545. The routers 545 may communicate an interest message to a modem 555. For example, router 545-c may communicated an interest message to modem 555-c indicating a desired content object or data packet. The modem 555-c may forward the interest message indicating the data packet to the MTS 505. When the MTS 505 communicates the data packet to the modems 555, the MTS 505 may include (e.g., insert, append) an identifier to the data packet indicating the one or more modems 555 that the data packet is intended. The MTS 505 may communicate the data packet (e.g., including the identifier) by a link between the CMTS 505 and the modems 555-a, 555-b, and 555-c. In some cases, communicating the data packet by the link may communicate the data packet to each of the modems 555-a, 555-b, and 555-c. The included identifier may enable corresponding modems 555 to detect and decode the data packet.

In some cases, if more than one of the modems 555-a, 555-b, and 555-c have requested the data packet, the identifier may correspond to at least all of the modems 555 that requested the data packet. For example, if modem 555-a and modem 555-b request a same data packet, the MTS 505 may append an identifier that corresponds to at least modems 555-a and 555-b. That is, a single identifier may correspond collectively to modems 555-*a* and 555-*b*. In some cases, the identifier may also correspond to modem 555-*c* (which did not request the data packet). Here, the modem 555-*c* may receive and decode the data packet (e.g., based on the identifier) and determine that none of the routers 545 in communication with modem 555-*c* have requested the data packet (e.g., based on determining a no match within a PIT). The modem 555-*c* may discard the data packet while the modems 555-*a* and 555-*b* may receive and decode the data packet and forward the data packet to the one or more routers 545 that requested the data packet. That is, the modem 555-*a* may determine (e.g., based on a PIT at the modem 555-*a*) that the data packet corresponds to router 545-*a*.

In some cases, the identifier (e.g., appended or inserted by the MTS 505 to the data packets) may be based on a preconfigured set of identifiers (e.g., configured by the MTS 505). Here, the MTS 505 may indicate to each of the modems 555-*a*, 555-*b*, and 555-*c* one or more identifiers associated with the modems 555. Thus, the modems 555 may monitor for data packets including one of the preconfigured identifiers.

The identifiers may correspond to a subset of the modems 555. In a first example, one or more of the identifiers may be a broadcast identifier (e.g., a broadcast DSID). Here, the identifier may correspond to all of the modems 555 (e.g., within an MD-DS-SG). In some cases, the broadcast identifiers may be based upon an orthogonal division multiplexing (ODM) profile of the modems 555. For example, a portion of the modems 555 may use a first ODM scheme while a second portion of the modems 555 use a second ODM scheme. The ODM schemes may correspond to an orthogonal frequency division multiplexing (OFDM) scheme, an orthogonal polarization division multiplexing scheme, an orthogonal time division multiplexing scheme, or an orthogonal frequency division multiple access (OFDMA) scheme. Here, the broadcast identifier may correspond to all of the modems 555 (e.g., within an MD-DS-SG) using a same ODM scheme.

In another example, one or more of the identifiers may be a multicast identifier (e.g., a multicast DSID). Here, the MTS 505 may group the modems 555 into one or more subsets and assign each of the subsets a multicast identifier. For example, the MTS 505 may create a first subset including modems 555-*a* and 555-*b* and a second subset including modems 555-*a* and 555-*c* and assign each of the subsets a distinct multicast identifier.

In another example, one or more of the identifiers may correspond to a unicast identifier (e.g., a unicast DSID). That is, the MTS 505 may assign each of the modems a unique identifier. In a fourth example, the MTS 505 may assign modems multiple identifiers according to multiple methods. For example, the MTS 505 may assign modem 555-*a* a unicast identifier, a broadcast identifier, a broadcast identifier based on an ODM profile of modem 555-*a*, and an identifier corresponding to a subset of the modems 555.

If the identifier is preconfigured, when the MTS 505 receives the interest message from a modem 555 (e.g., modem 555-*c*), the MTS 505 may first determine whether the requested data packet is present (e.g., at a CS of the MTS 505). If the data packet is not present, the MTS 505 may check a PIT at the MTS to determine if a second modem 555 (e.g., modem 555-*a* or modem 555-*b*) has already requested the data packet. If the name of the data packet or content object is already in the PIT, the MTS 505 may add an identifier (e.g., corresponding to the modem 555-*c*) to the entry in the PIT. In some cases, the MTS 505 may add the identifier if the existing entry corresponds to a modem 555 within a same MD-DS-SG as the modem 555-*c*. If the MTS 505 determines that a second modem 555 has not already requested the data packet, the MTS 505 may forward the interest message to an upstream node by face indicated by a FIB at the MTS 505. For example, the MTS 505 may forward the interest message to either the producer 510-*c* or CCN Forwarder 515. The MTS 505 may also add the data packet or content object name and an identifier of the modem 555-*c* to the PIT.

When the data packet arrives at the MTS 505, the MTS 505 may check the PIT to determine which of the modems 555 have requested the data packet. Based on the modems 555 that have requested the data packet, the MTS 505 may include (e.g., append, insert) an identifier corresponding to at least the relevant modems 555 and forward the data packet to the modems 555. For example, if modems 555-*b* and 555-*c* have requested the data packet, the MTS 505 may append an identifier (previously indicated to the modems 555-*b* and 555-*c*) corresponding to the modems 555-*b* and 555-*c* to the data packet. Therefore, modems 555-*b* and 555-*c* may detect and decode the data packet while modem 555-*a* may not decode the data packet (e.g., based on the identifier not corresponding to the modem 555-*a*). Alternatively, the MTS 505 may append an identifier corresponding to all of the modems 555. Here, all of the modems 555-*a*, 555-*b*, and 555-*c* may receive and decode the data packet (e.g., based on the identifier corresponding to each of the modems 555-*a*, 555-*b*, and 555-*c*), but modem 555-*a* may discard the data packet based on determining the data packet does not match an entry within a PIT table at modem 555-*a*.

In some other cases, the identifier (e.g., appended or inserted by the MTS 505 to the data packets) may be based on the content object name (e.g., the data packet name) In some cases, the identifier may be a hash of the content object name. For example, the identifier may be a 20-bit DSID comprising an 18-bit or 19-bit hash of the content object name Here, the identifier may include the hash of the content object name prepended by a known pattern in order to equal 20 bits.

When the identifier is a hash of the content object name, a modem 555 may receive an interest message indicating a request for a data packet or content object. The modem 555 may generate the hash value based on the content object name and store a PIT entry based on the hash of the content object name The modem 555 may transmit the interest message including the content object name to the MTS 505. The MTS 505 may receive the interest message and similarly calculate the hash of the content object name. If the data packet is not present at the MTS 505 (e.g., at a CS of the MTS 505), the MTS 505 may check a PIT at the MTS to determine if a second modem 555 has already requested the data packet. If the name of the content object is already in the PIT, the MTS 505 may add additional downstream bonding groups (e.g., if necessary) to the entry in the PIT. The downstream bonding groups may correspond to a set of two or more downstream channels that are available to the MTS 505. For example, the downstream bonding groups may be based on a face of the MTS 505 where each of the modems 555-*a*, 555-*b*, and 555-*c* are part of a same bonding group. If the MTS 505 determines that a second modem 555 has not already requested the data packet, the MTS 505 may forward the interest message to an upstream node by face indicated by a FIB at the MTS 505. For example, the MTS 505 may forward the interest message to either the producer 510-*c* or CCN Forwarder 515. The MTS 505 may also add the data packet or content object name, the hash value of the content object name and an indication of the downstream bonding group associated with the interest message to the PIT.

When the data packet arrives at the MTS 505, the MTS 505 may check the PIT to determine the hash value for the data packet. For example, the MTS 505 may calculate the hash value for the data packet and use it for PIT lookup. In some cases, the MTS 505 may further determine which downstream bonding groups are associated with the interest message. The MTS 505 may append the identifier including the hash of the content object name prepended by a known pattern and forward the data packet to the modems 555. Here, only the modems 555 that communicated an interest message corresponding to the data packet detect and decode the data packet. That is, each modem 555 may utilize its PIT (e.g., including a list of content object name hashes) as a set of DSID filters and can extract the relevant CCN frames from the downstream bonding group.

Figure 6A:
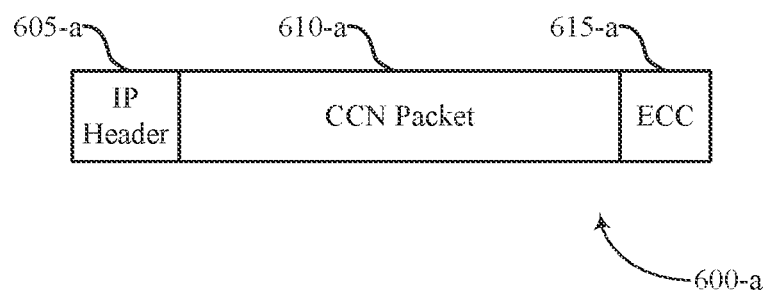
FIGS. 6A and 6B are schematic illustrations of an internet protocol (IP) packet in accordance with the present disclosure.

FIG. 6A is a schematic illustration of a IP packet 600-*a* that supports CCN systems and methods in accordance with an embodiment of the present disclosure. IP packet 600-*a* may include IP header 605-*a*, a CCN packet 610-*a*, and an error correction code (ECC) 615-*a*. In some cases, CCN packet 610-*a* may correspond to a data packet as discussed with references to FIGS. 1 through 5. Here, IP packet 600-*a* may correspond to an IP packet 600-*a* received by an MTS (e.g., a CMTS as described with reference to FIG. 5) from an upstream node (e.g., a producer, another MTS).

The IP header 605-*a* may include IP information related to the source and destination of IP packet 600-*a*. For example, the header may include an IP address corresponding to the upstream node and an IP address corresponding to the MTS. The ECC 615-*a* may provide error detection or correction information for the CCN packet 610-*a*. That is, the data included within the CCN packet 610-*a* may become corrupted during communication. The ECC 615-*a* may enable a receiving node to detect and/or correct some errors within the data of the CCN packet 610-*a*.

Figure 6B:
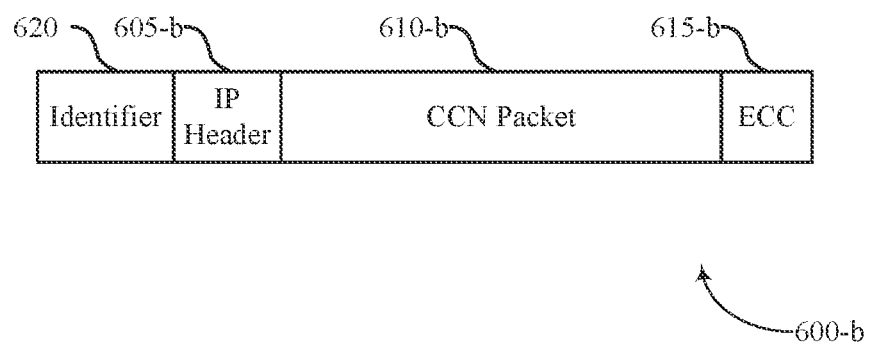

FIG. 6B is a schematic illustration of a IP packet 600-*b* that supports CCN systems and methods in accordance with an embodiment of the present disclosure. IP packet 600-*b* may include an IP header 605-*b*, a CCN packet 610-*b*, and ECC 615-*b*, and identifier 620. CCN packet 610-*b* may correspond to a data packet as discussed with reference to FIGS. 1 through 5. The IP packet 600-*b* may include a same IP header 605-*b*, CCN packet 610-*b*, and ECC 615-*b* as in IP packet 600-*a* as described with reference to FIG. 6A. For example, while IP packet 600-*a* may correspond to an IP packet received by an MTS, the IP packet 600-*b* may correspond to a IP packet 600-*b* communicated from the MTS (e.g., a CMTS as described with reference to FIG. 5) to a downstream node (e.g., a CM as discussed with reference to FIG. 5). That is, IP packet 600-*b* may a result of appending the identifier 620 to the IP packet 600-*a*.

The MTS may receive the IP packet 600-*a* and determine an identifier to append to the IP packet 600-*a* to generate the IP packet 600-*b*. For example, the MTS may append a preconfigured identifier to IP packet 600-*a*, the identifier correspond to at least one downstream node requesting the CCN packet. Alternatively, the identifier may correspond to a hash of a content object name associated with the CCN packet. The identifier (e.g., a DSID) may enable downstream nodes requesting the CCN packet 610-*b* to detect and decode the IP packet 600-*b*.

Figure 7:
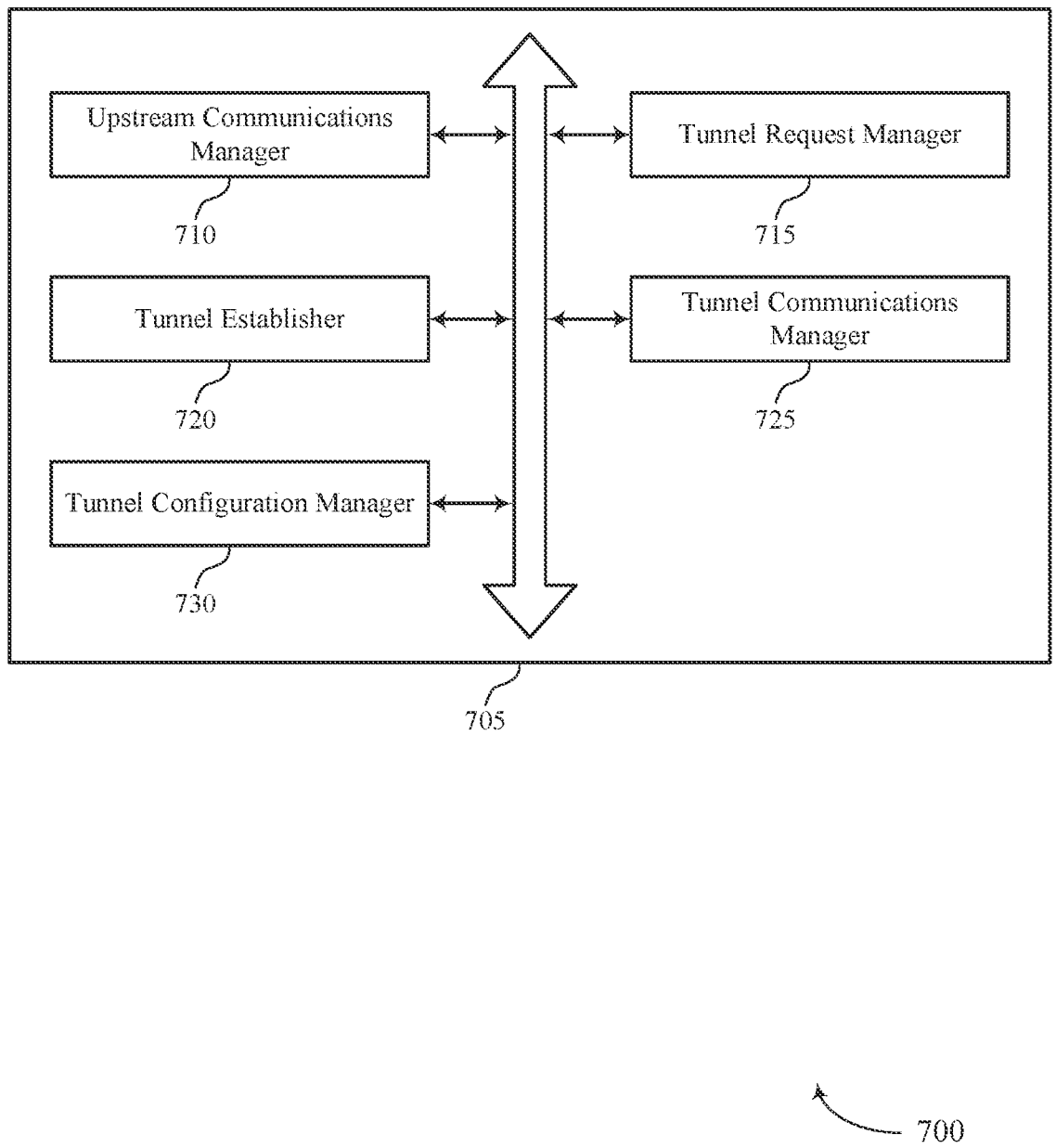
FIGS. 7 and 8 show block diagrams of a node in accordance with the present disclosure.

FIG. 7 shows a block diagram 700 of node 705 that supports content centric networking systems and methods in accordance with examples as disclosed herein. The node 705 may be an example of aspects of a node as described with reference to FIGS. 1 and 2. The node 705 may be an example of aspects of a tunnel endpoint as described with reference to FIG. 4 or a CMTS as described with reference to FIGS. 3 through 5. In some cases, the node is an MTS including a CMTS, an OLT, or a mobile core. In some other cases, the node 705 may correspond to a router as described with reference to FIGS. 1 and 2 through 5. The node 705 may include an upstream communications manager 710, a tunnel request manager 715, a tunnel establisher 720, a tunnel communications manager 725, and a tunnel configuration manager 730. Each of these modules may communicate, directly or indirectly, with one another (e.g., via one or more buses).

The tunnel request manager 715 may receive, from a router, a request to establish a persistent IP tunnel. The router may be a DSL modem, an ONT, or a small cell. In some examples, receiving the request to establish the persistent IP tunnel includes receiving the request via a link layer of a protocol stack. In some examples, the tunnel request manager 715 may receive, from a second router, a second request to establish a second persistent IP tunnel.

The tunnel request manager 715 may communicate to a node, a request to establish a persistent IP tunnel, where the request to establish the persistent IP tunnel may be based on the configuration information.

The tunnel configuration manager 730 may receive, from a server, configuration information for the persistent IP tunnel. In some cases, the configuration information includes one or more addresses for the persistent IP tunnel. In some cases, each of the one or more addresses are encoded as TLVs.

The upstream communications manager 710 may forward the configuration information to the router, where the request to establish the persistent IP tunnel is based on the configuration information. In some examples, the upstream communications manager 710 may forward the interest message to a second node based on the indicated content. In some instances, the upstream communications manager 710 may receive, from the second node, the indicated content. In some cases, the upstream communications manager 710 may forward the interest message to a second node based on the indicated content. In some examples, the upstream communications manager 710 may receive, from the second node, the indicated content based on forwarding the interest message.

The tunnel establisher 720 may establish the persistent IP tunnel between the node and the router upon receiving the request. In some examples, the tunnel establisher 720 may transmit, to the router, a message indicating the establishing the persistent IP tunnel based on receiving the request to establish the persistent IP tunnel. In some instances, the tunnel establisher 720 may receive, from the router, an acknowledgement indicating successful receipt of the message indicating the establishing the persistent IP tunnel. In some cases, the tunnel establisher 720 may establish the second persistent IP tunnel between the node and the second router based on the second request, where establishing the second persistent IP tunnel occurs at a time when the persistent IP tunnel is established. In some cases, the tunnel establisher 720 may establish a face (e.g., face 230 as described with reference to FIG. 2) on the node 705 corresponding to the persistent IP tunnel.

The tunnel establisher 720 may receive an indication, from the node, that indicates the establishing of the persistent IP tunnel.

The tunnel communications manager 725 may communicate a CCN packet via the persistent IP tunnel between the node to the router. In some examples, the tunnel communications manager 725 may receive, from the router and by the persistent IP tunnel, an interest message indicating content. In some instances, the tunnel communications manager 725 may forward the indicated content to the router by the persistent IP tunnel. In some cases, the tunnel communications manager 725 may forward the indicated content to the router is based on an entry in a PIT associating the indicated content with the router. In some examples, the tunnel communications manager 725 may communicate one or more CCN packets via the second persistent IP tunnel between the node and the second router.

The tunnel communications manager 725 may receive, from the router and by the persistent IP tunnel, an interest message indicating content. In some examples, the tunnel communications manager 725 may forward the indicated content to the router by the persistent IP tunnel based on receiving the interest message from the router. In some cases, the tunnel communications manager 725 may receive, from the second router and by the second persistent IP tunnel, a second interest message indicating the content, where the receiving the second interest message occurs after forwarding the interest message to the second node. Here, the tunnel communications manager 725 may forward the indicated content to the second router by the second persistent IP tunnel based on receiving the second interest message from the second router.

Figure 8:
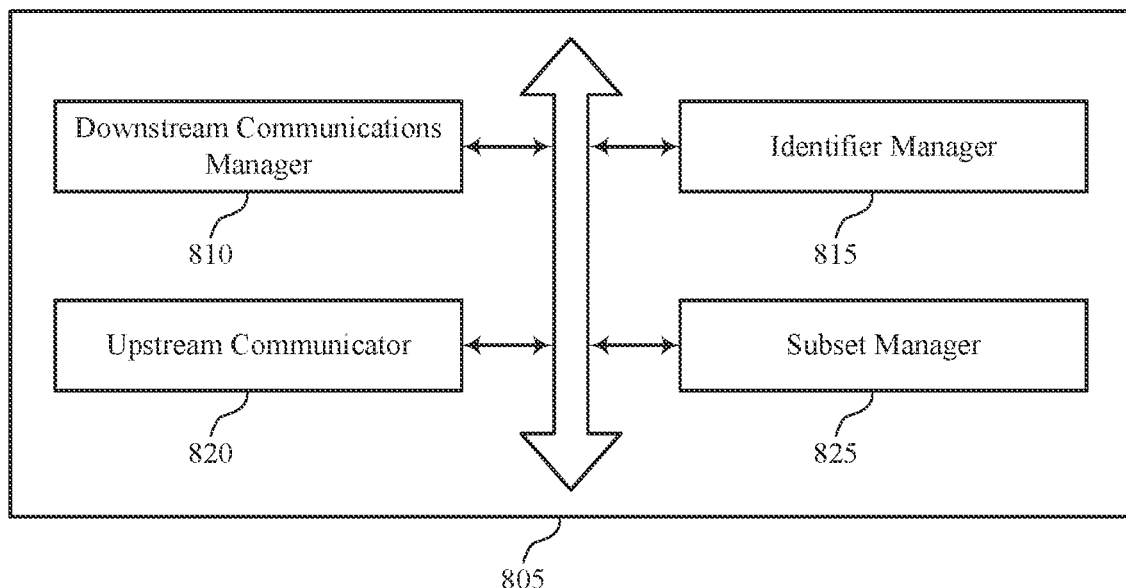

FIG. 8 shows a block diagram 800 of a node 805 that supports content centric networking systems and methods in accordance with examples as disclosed herein. The node 805 may be an example of aspects of a node as described with reference to FIGS. 1 and 2. The node 805 may be an example of aspects of a CMTS as described with reference to FIGS. 3 through 5. In some cases, the node 805 may be an MTS. The node 805 may include a downstream communications manager 810, an identifier manager 815, an upstream communicator 820, and a subset manager 825. Each of these modules may communicate, directly or indirectly, with one another (e.g., via one or more buses).

The downstream communications manager 810 may forward the CCN packet with the appended identifier to the one or more downstream nodes. The one or more downstream nodes may include CMs. In some examples, the downstream communications manager 810 may receive, from a downstream node, an interest message including a content identifier indicating a CCN packet. In some cases, the downstream communications manager 810 may forward the CCN packet with the appended hash value to the downstream node. In some instances, the downstream communications manager 810 may receive, at the node, an interest message from a first downstream node, the interest message including a content identifier indicating some content within the CCN packet. In some examples, the downstream communications manager 810 may receive, from a second downstream node, a second interest message including the content identifier, where the subset of one or more downstream nodes includes the first downstream node and the second downstream node.

The identifier manager 815 may append an identifier to the CCN packet, where the identifier is associated with at least the subset of one or more downstream nodes. In some cases, the identifier includes one or more bits of a DSID. In some examples, the identifier manager 815 may generate a hash value based on the content identifier. In some cases, the identifier manager 815 may append the hash value to the CCN packet. In some instances, the identifier manager 815 may generate the appended identifier based on the content identifier. In some cases, the appended identifier enables the subset of one or more downstream nodes to decode the CCN packet. In some examples, the appended identifier is associated with each of the one or more downstream nodes. In some cases, the appended identifier is associated with a group of downstream nodes of a same ODM scheme, the group of downstream nodes including at least the subset of one or more downstream nodes. The ODM may be OFDM, orthogonal polarization division multiplexing, orthogonal time division multiplexing, or OFDMA. In some cases, the appended identifier is associated with the single downstream node.

In some cases, the downstream communications manager 810 may transmit an indication to each of the one or more downstream nodes indicating one or more identifiers associated with each of the one or more downstream nodes, where the transmitting the indication occurs prior to receiving the CCN packet.

The upstream communicator 820 may forward the interest message including the content identifier to an upstream node. The upstream node may be a producer or a router. In some cases, the upstream communicator 820 may receive, at a node, a CCN packet from an upstream node. In some examples, the upstream communicator 820 may receive the CCN packet from the upstream node based on forwarding the interest message. In some examples, the upstream communicator 820 may forward the interest message to the upstream node prior to receiving the CCN packet.

The subset manager 825 may identify a subset of one or more downstream nodes associated with the CCN packet. In some examples, the subset manager 825 may determine the subset of one or more downstream nodes associated with the appended identifier based on receiving the interest message including the content identifier. In some cases, the subset includes each of the one or more downstream nodes. In some instances, the subset includes a single downstream node of the one or more downstream nodes. In some examples, although the identifier may be referred to as an appended identifier, the identifier may be inserted into the data packets, appended to the data packets, or otherwise appropriately included with the data packets, by the CMTS.

Figure 9:
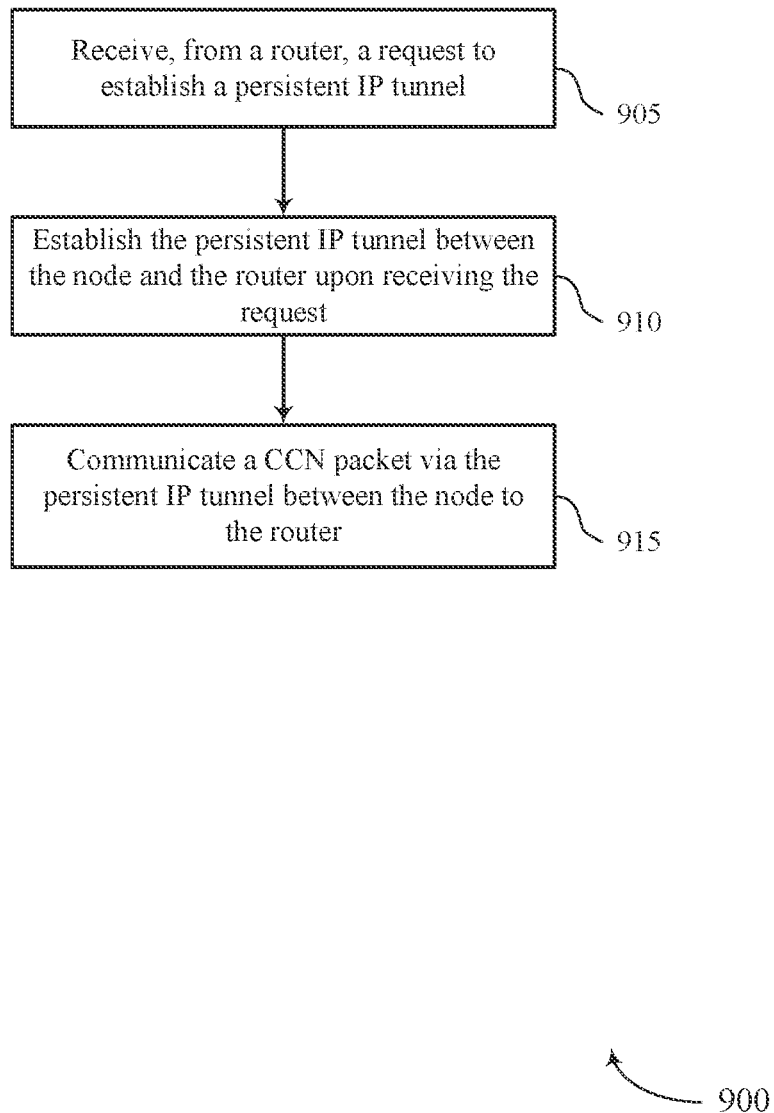
FIGS. 9 through 14 show flowcharts illustrating a method or methods in accordance with the present disclosure.

FIG. 9 shows a flowchart illustrating a method or methods 900 that supports content centric networking systems and methods in accordance with aspects of the present disclosure. The operations of method 900 may be implemented by a node or its components as described herein. For example, the operations of method 900 may be performed by a node as described with reference to FIG. 7. In some examples, a node may execute a set of instructions to control the functional elements of the node to perform the described functions. Additionally or alternatively, a node may perform aspects of the described functions using special-purpose hardware.

At 905, the node may receive, from a router, a request to establish a persistent IP tunnel. The operations of 905 may be performed according to the methods described herein. In some examples, aspects of the operations of 905 may be performed by a tunnel request manager as described with reference to FIG. 7.

At 910, the node may establish the persistent IP tunnel between the node and the router upon receiving the request. The operations of 910 may be performed according to the methods described herein. In some examples, aspects of the operations of 910 may be performed by a tunnel establisher as described with reference to FIG. 7.

At 915, the node may communicate a CCN packet via the persistent IP tunnel between the node to the router. The operations of 915 may be performed according to the methods described herein. In some examples, aspects of the operations of 915 may be performed by a tunnel communications manager as described with reference to FIG. 7.

Figure 10:
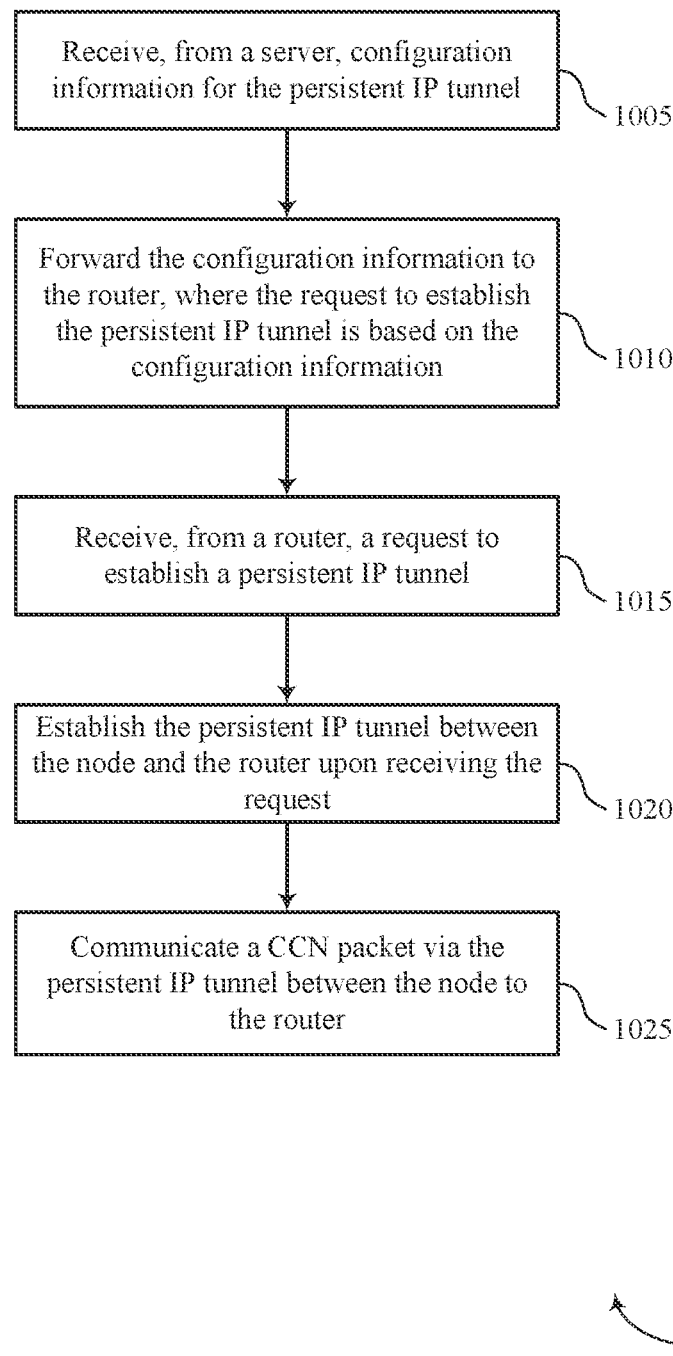

FIG. 10 shows a flowchart illustrating a method or methods 1000 that supports content centric networking systems and methods in accordance with aspects of the present disclosure. The operations of method 1000 may be implemented by a node or its components as described herein. For example, the operations of method 1000 may be performed by a node as described with reference to FIG. 7. In some examples, a node may execute a set of instructions to control the functional elements of the node to perform the described functions. Additionally or alternatively, a node may perform aspects of the described functions using special-purpose hardware.

At 1005, the node may receive, from a server, configuration information for the persistent IP tunnel. The operations of 1005 may be performed according to the methods described herein. In some examples, aspects of the operations of 1005 may be performed by a tunnel configuration manager as described with reference to FIG. 7.

At 1010, the node may forward the configuration information to the router, where the request to establish the persistent IP tunnel is based on the configuration information. The operations of 1010 may be performed according to the methods described herein. In some examples, aspects of the operations of 1010 may be performed by an upstream communications manager as described with reference to FIG. 7.

At 1015, the node may receive, from a router, a request to establish a persistent IP tunnel. The operations of 1015 may be performed according to the methods described herein. In some examples, aspects of the operations of 1015 may be performed by a tunnel request manager as described with reference to FIG. 7.

At 1020, the node may establish the persistent IP tunnel between the node and the router upon receiving the request. The operations of 1020 may be performed according to the methods described herein. In some examples, aspects of the operations of 1020 may be performed by a tunnel establisher as described with reference to FIG. 7.

At 1025, the node may communicate a CCN packet via the persistent IP tunnel between the node to the router. The operations of 1025 may be performed according to the methods described herein. In some examples, aspects of the operations of 1025 may be performed by a tunnel communications manager as described with reference to FIG. 7.

Figure 11:
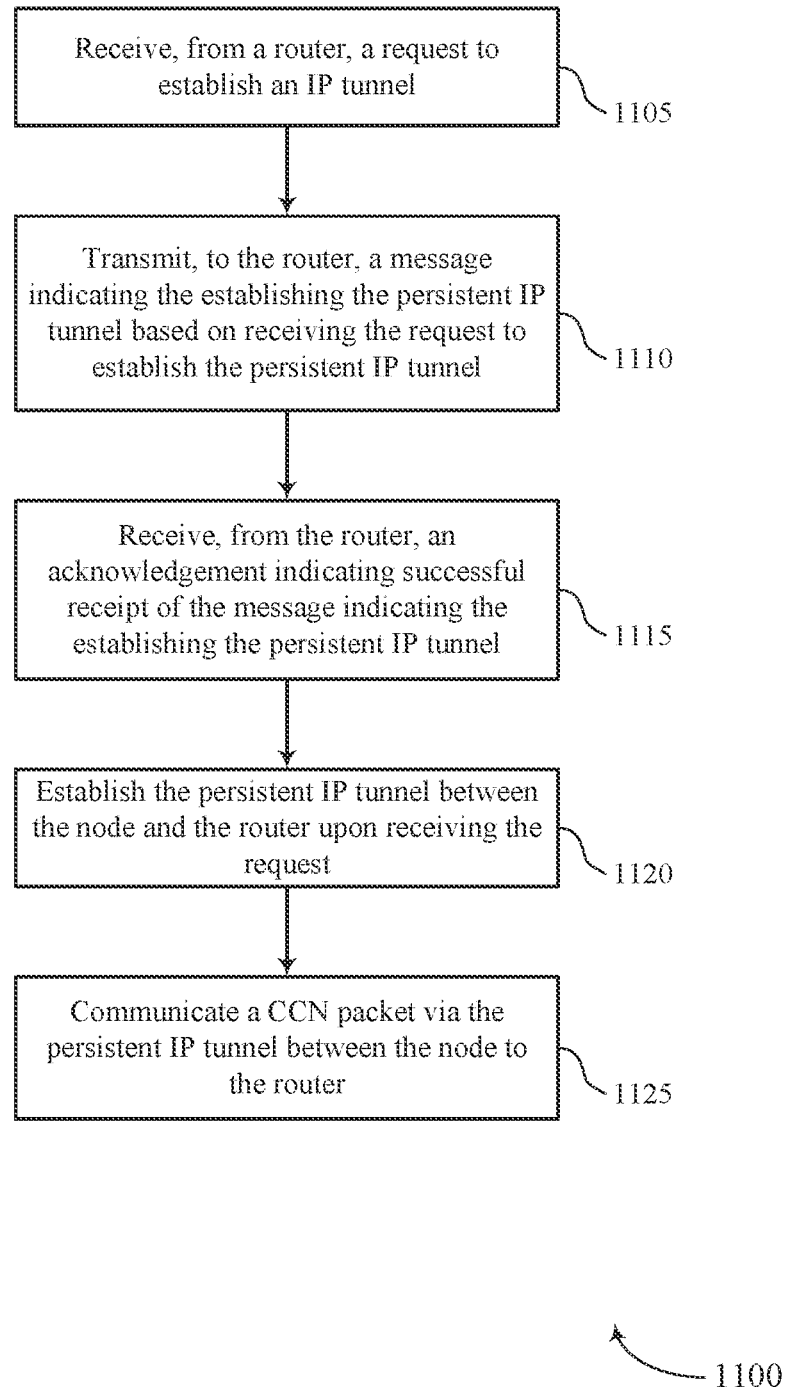

FIG. 11 shows a flowchart illustrating a method or methods 1100 that supports content centric networking systems and methods in accordance with aspects of the present disclosure. The operations of method 1100 may be implemented by a node or its components as described herein. For example, the operations of method 1100 may be performed by a node as described with reference to FIG. 7. In some examples, a node may execute a set of instructions to control the functional elements of the node to perform the described functions. Additionally or alternatively, a node may perform aspects of the described functions using special-purpose hardware.

At 1105, the node may receive, from a router, a request to establish a persistent IP tunnel. The operations of 1105 may be performed according to the methods described herein. In some examples, aspects of the operations of 1105 may be performed by a tunnel request manager as described with reference to FIG. 7.

At 1110, the node may transmit, to the router, a message indicating the establishing the persistent IP tunnel based on receiving the request to establish the persistent IP tunnel. The operations of 1110 may be performed according to the methods described herein. In some examples, aspects of the operations of 1110 may be performed by a tunnel establisher as described with reference to FIG. 7.

At 1115, the node may receive, from the router, an acknowledgement indicating successful receipt of the message indicating the establishing the persistent IP tunnel. The operations of 1115 may be performed according to the methods described herein. In some examples, aspects of the operations of 1115 may be performed by a tunnel establisher as described with reference to FIG. 7.

At 1120, the node may establish the persistent IP tunnel between the node and the router upon receiving the request. The operations of 1120 may be performed according to the methods described herein. In some examples, aspects of the operations of 1120 may be performed by a tunnel establisher as described with reference to FIG. 7.

At 1125, the node may communicate a CCN packet via the persistent IP tunnel between the node to the router. The operations of 1125 may be performed according to the methods described herein. In some examples, aspects of the operations of 1125 may be performed by a tunnel communications manager as described with reference to FIG. 7.

Figure 12:
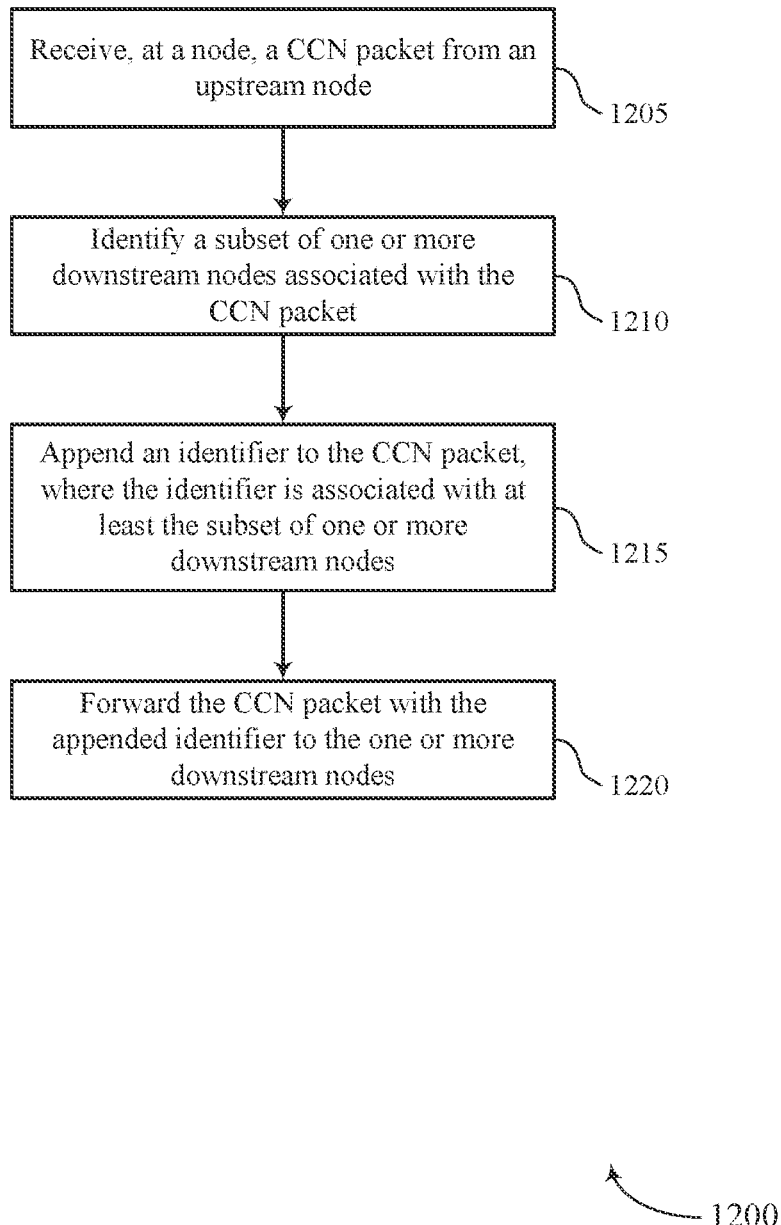

FIG. 12 shows a flowchart illustrating a method or methods 1200 that supports content centric networking systems and methods in accordance with aspects of the present disclosure. The operations of method 1200 may be implemented by a node or its components as described herein. For example, the operations of method 1200 may be performed by a node as described with reference to FIG. 8. In some examples, a node may execute a set of instructions to control the functional elements of the node to perform the described functions. Additionally or alternatively, a node may perform aspects of the described functions using special-purpose hardware.

At 1205, the node may receive, at a node, a CCN packet from an upstream node. The operations of 1205 may be performed according to the methods described herein. In some examples, aspects of the operations of 1205 may be performed by an upstream communicator as described with reference to FIG. 8.

At 1210, the node may identify a subset of one or more downstream nodes associated with the CCN packet. The operations of 1210 may be performed according to the methods described herein. In some examples, aspects of the operations of 1210 may be performed by a subset manager as described with reference to FIG. 8.

At 1215, the node may append an identifier to the CCN packet, where the identifier is associated with at least the subset of one or more downstream nodes. The operations of 1215 may be performed according to the methods described herein. In some examples, aspects of the operations of 1215 may be performed by an identifier manager as described with reference to FIG. 8.

At 1220, the node may forward the CCN packet with the appended identifier to the one or more downstream nodes. The operations of 1220 may be performed according to the methods described herein. In some examples, aspects of the operations of 1220 may be performed by a downstream communications manager as described with reference to FIG. 8.

Figure 13:
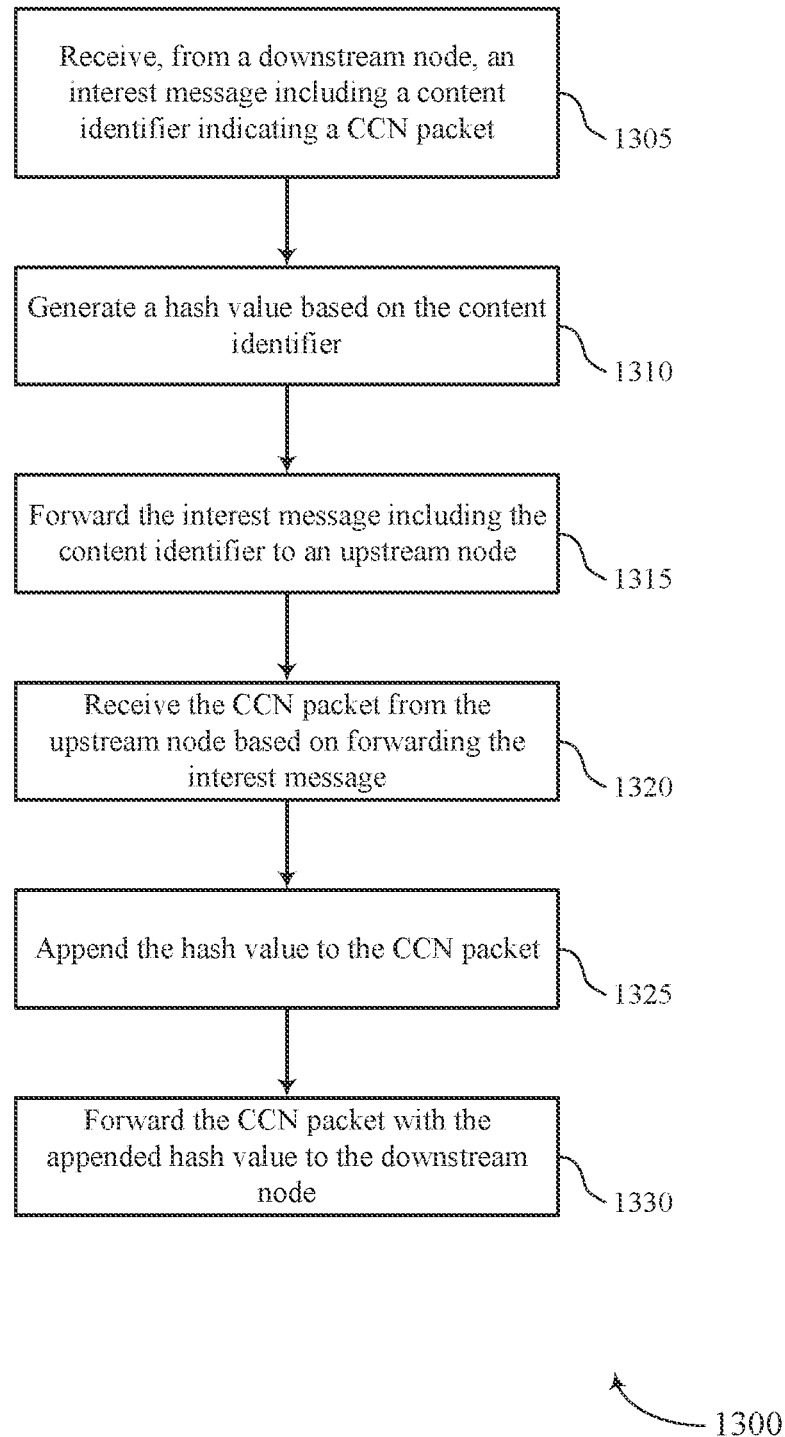

FIG. 13 shows a flowchart illustrating a method or methods 1300 that supports content centric networking systems and methods in accordance with aspects of the present disclosure. The operations of method 1300 may be implemented by a node or its components as described herein. For example, the operations of method 1300 may be performed by a node as described with reference to FIG. 8. In some examples, a node may execute a set of instructions to control the functional elements of the node to perform the described functions. Additionally or alternatively, a node may perform aspects of the described functions using special-purpose hardware.

At 1305, the node may receive, from a downstream node, an interest message including a content identifier indicating a CCN packet. The operations of 1305 may be performed according to the methods described herein. In some examples, aspects of the operations of 1305 may be performed by a downstream communications manager as described with reference to FIG. 8.

At 1310, the node may generate a hash value based on the content identifier. The operations of 1310 may be performed according to the methods described herein. In some examples, aspects of the operations of 1310 may be performed by an identifier manager as described with reference to FIG. 8.

At 1315, the node may forward the interest message including the content identifier to an upstream node. The operations of 1315 may be performed according to the methods described herein. In some examples, aspects of the operations of 1315 may be performed by an upstream communicator as described with reference to FIG. 8.

At 1320, the node may receive the CCN packet from the upstream node based on forwarding the interest message. The operations of 1320 may be performed according to the methods described herein. In some examples, aspects of the operations of 1320 may be performed by an upstream communicator as described with reference to FIG. 8.

At 1325, the node may append the hash value to the CCN packet. The operations of 1325 may be performed according to the methods described herein. In some examples, aspects of the operations of 1325 may be performed by an identifier manager as described with reference to FIG. 8.

At 1330, the node may forward the CCN packet with the appended hash value to the downstream node. The operations of 1330 may be performed according to the methods described herein. In some examples, aspects of the operations of 1330 may be performed by a downstream communications manager as described with reference to FIG. 8.

Figure 14:
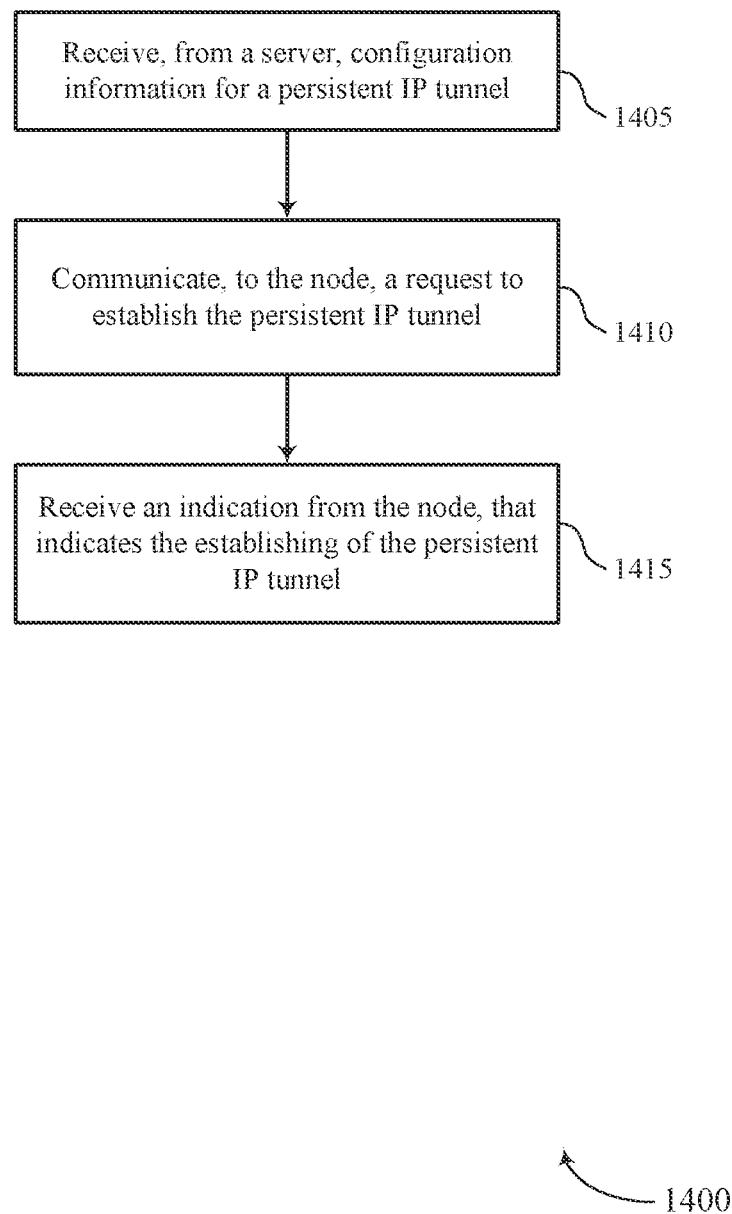

FIG. 14 shows a flowchart illustrating a method or methods 1400 that supports content centric networking systems and methods in accordance with aspects of the present disclosure. The operations of method 1400 may be implemented by a router or its components as described herein. For example, the operations of method 1400 may be performed by a router as described with reference to FIG. 7. In some examples, a router may execute a set of instructions to control the functional elements of the router to perform the described functions. Additionally or alternatively, a router may perform aspects of the described functions using special-purpose hardware.

At 1405, the router may receive, from a server, configuration information for the persistent IP tunnel. The operations of 1405 may be performed according to the methods described herein. In some examples, aspects of the operations of 1405 may be performed by a tunnel configuration manager as described with reference to FIG. 7.

At 1410, the router may communicate to the node, a request to establish a persistent IP tunnel, where the request to establish the persistent IP tunnel is based at least in part on the configuration information. The operations of 1410 may be performed according to the methods described herein. In some examples, aspects of the operations of 1410 may be performed by a tunnel request manager as described with reference to FIG. 7.

At 1415, the router may receive an indication from the node, that indicates the establishing of the persistent IP tunnel. The operations of 1415 may be performed according to the methods described herein. In some examples, aspects of the operations of 1415 may be performed by a tunnel communications manager as described with reference to FIG. 7.

It should be noted that the methods described herein describe possible implementations, and that the operations and the steps may be rearranged or otherwise modified and that other implementations are possible. Further, portions from two or more of the methods may be combined.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

A number of terms may be referenced herein and may be interpreted as set forth below.

The singular forms "a," "an," and "the" include plural references unless the context clearly dictates otherwise.

"Optional" or "optionally" may indicate that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of establishing and using a persistent Internet Protocol (IP) tunnel between a first node of a network and a second node of the network, the method comprising:
    requesting, from a third node of the network, a configuration file by trivial file transfer protocol (TFTP) and through a first type of networking, the configuration file indicating an address of the first node corresponding to a tunnel endpoint for the persistent IP tunnel;
    receiving, at the third node of the network, the configuration file through the first type of networking;
    transmitting, by the third node, the configuration file to the second node using type-length-value (TLV) encoding and through the first type of networking;
    using the configuration file, identifying, at the second node, the address of the first node;
    transmitting, from the second node and using the address of the first node, a request to the first node to establish the persistent IP tunnel between the second node and the first node, the request transmitted through the first type of networking;
    establishing the persistent IP tunnel between the first node and the second node upon receiving the request to establish the persistent IP tunnel, the persistent IP tunnel established in accordance with the first type of networking; and
    communicating a Content-Centric Networking (CCN) packet via the persistent IP tunnel between the first node and the second node, wherein communicating the CCN packet comprises using the persistent IP tunnel to communicate the CCN packet between the first node and the second node using a second type of networking, the second type of networking different from the first type of networking.

2. The method of claim 1, wherein establishing the persistent IP tunnel further comprises:
    transmitting, from the first node to the second node, a message indicating that the persistent IP tunnel has been established based at least in part on receiving the request to establish the persistent IP tunnel; and
    receiving, at the first node and from the second node, an acknowledgement indicating successful receipt of the message indicating that the persistent IP tunnel has been established.

3. The method of claim 1, further comprising receiving, at the first node, from the second node, through the second type of networking, and by the persistent IP tunnel, an interest message indicating content.

4. The method of claim 3, further comprising forwarding, by the first node, the interest message to an upstream node based at least in part on the indicated content.

5. The method of claim 4, further comprising:
    receiving, at the first node and from the upstream node, the indicated content; and
    forwarding the indicated content to the second node by the persistent IP tunnel through the second type of networking.

6. The method of claim 5, wherein forwarding the indicated content to the second node is based at least in part on an entry in a pending interest table (PIT) at the first node associating the indicated content and the second node.

7. The method of claim 1, wherein:
    the persistent IP tunnel is a first persistent IP tunnel; and
    the method further comprises:
        receiving, from a fourth node, a second request to establish a second persistent IP tunnel between the first node and the fourth node;
        establishing the second persistent IP tunnel between the first node and the fourth node based at least in part on the second request, wherein establishing the second persistent IP tunnel occurs at a time when the first persistent IP tunnel is established; and
        communicating, through the second type of networking, one or more CCN packets via the second persistent IP tunnel between the first node and the fourth node.

8. The method of claim 7, further comprising:
receiving, at the first node, from the second node, and by the first persistent IP tunnel, a first interest message indicating content;
forwarding by the first node, the first interest message to an upstream node based at least in part on the content;
receiving, from the fourth node and by the second persistent IP tunnel, a second interest message indicating the content, wherein receiving the second interest message occurs after forwarding the first interest message to the second node;
receiving, at the first node and from the upstream node, the content based at least in part on forwarding the first interest message;
forwarding, from the first node, the content to the second node by the first persistent IP tunnel based at least in part on receiving the first interest message from the second node; and
forwarding, from the first node, the content to the fourth node by the second persistent IP tunnel based at least in part on receiving the second interest message from the fourth node.

9. The method of claim 1, wherein receiving the request to establish the persistent IP tunnel comprises receiving the request via a link layer of a protocol stack.

10. The method of claim 1, wherein the second node is one of a router, a digital subscriber line (DSL) modem, an optical network terminal (ONT), or a small cell.

11. The method of claim 1, wherein the first node is a modem termination system (MTS) comprising at least one of a cable MTS (CMTS), an optical line terminator (OLT), or a mobile core.

12. A method at a router of a network utilizing a first type of networking, the method comprising:
receiving, from a modem distinct from the router, a configuration file indicating an address of a node of the network, the node corresponding to an endpoint for a persistent Internet Protocol (IP) tunnel between the router and the node of the network and the configuration file encoded with type-length-value (TLV) encoding and received at the router through a first type of networking;
using the address indicated in the configuration file, communicating, to the node, a request to establish the persistent IP tunnel in accordance with the first type of networking;
receiving an indication from the node that indicates that the persistent IP tunnel has been established; and
receiving a Content-Centric Networking (CCN) packet via the persistent IP tunnel from the node, wherein the CCN packet is communicated between the node and the router using a second type of networking, the second type of networking different from the first type of networking.

13. The method of claim 1, wherein communicating the CCN packet via the persistent IP tunnel between the first node and the second node includes transmitting the CCN packet through the third node between the first node and the second node without the third node decoding or detecting content within the CCN packet.

14. The method of claim 13, wherein the third node is a cable modem.

15. The method of claim 1, wherein:
the first type of networking is IP networking; and
the second type of networking is CCN networking.

16. The method of claim 12, wherein receiving the CCN packet via the persistent IP tunnel from the node includes receiving the CCN packet through the modem between the node and the router without the modem decoding or detecting content within the CCN packet.

17. The method of claim 1, further comprising transmitting, from the first node, a dynamic host configuration protocol (DHCP) message to a server, the DHCP message requesting an IP address of the server.

18. The method of claim 17, further comprising receiving, at the first node, a DHCP response from the server, the DHCP response including the IP address of the server.

19. The method of claim 12, wherein the CCN packet is encapsulated with an IP header, the IP header readable by the modem for use in determining a transmission location.

20. The method of claim 12, wherein the modem transmits a trivial file transfer protocol (TFTP) request to a server to request the configuration file from the server.

* * * * *